US008699778B2

(12) United States Patent
Teo et al.

(10) Patent No.: US 8,699,778 B2
(45) Date of Patent: Apr. 15, 2014

(54) IMAGE CODING METHOD, IMAGE CODING APPARATUS, PROGRAM, AND INTEGRATED CIRCUIT

(75) Inventors: Han Boon Teo, Singapore (SG); Chong Soon Lim, Singapore (SG); Viktor Wahadaniah, Singapore (SG); Youji Shibahara, Osaka (JP); Takahiro Nishi, Nara (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 13/120,677

(22) PCT Filed: Jul. 12, 2010

(86) PCT No.: PCT/JP2010/004503
§ 371 (c)(1),
(2), (4) Date: Mar. 24, 2011

(87) PCT Pub. No.: WO2011/013304
PCT Pub. Date: Feb. 3, 2011

(65) Prior Publication Data
US 2011/0176740 A1    Jul. 21, 2011

(30) Foreign Application Priority Data
Jul. 29, 2009    (JP) .................................. 2009-176891

(51) Int. Cl.
*G06K 9/00* (2006.01)
(52) U.S. Cl.
USPC ................. 382/136; 375/240.16; 375/240.14; 375/240.17
(58) Field of Classification Search
USPC ........... 375/240.12, 240.16, 240.03, E07.125; 382/236
See application file for complete search history.

(56) References Cited

U.S. PATENT DOCUMENTS

| 5,347,309 A | 9/1994 | Takahashi |
| 5,510,840 A | 4/1996 | Yonemitsu et al. |
| 5,784,107 A | 7/1998 | Takahashi |

(Continued)

FOREIGN PATENT DOCUMENTS

| JP | 6-165146 | 6/1994 |
| JP | 11-112973 | 4/1999 |

(Continued)

OTHER PUBLICATIONS

International Search Report issued Oct. 12, 2010 in International (PCT) Application No. PCT/JP2010/004503.

(Continued)

*Primary Examiner* — Mekonen Bekele
(74) *Attorney, Agent, or Firm* — Wenderoth, Lind & Ponack, L.L.P.

(57) ABSTRACT

An image coding method determines one of frame coding and field coding while suppressing an increase in the complexity. The image coding method includes coding a current picture included in the pictures; determining whether a picture next to the current picture is to be coded in frame coding or field coding, depending on motion information that is information for indicating a motion in the current picture; and coding the next picture in frame coding when it is determined in the determining that the next picture is to be coded in frame coding, and coding the next picture in field coding when it is determined in the determining that the next picture is to be coded in field coding.

7 Claims, 23 Drawing Sheets

(56) References Cited

U.S. PATENT DOCUMENTS

| | | | |
|---|---|---|---|
| 6,421,385 | B1 | 7/2002 | Uenoyama et al. |
| 7,206,026 | B2 * | 4/2007 | Hsiung et al. .................. 348/441 |
| 7,515,635 | B2 * | 4/2009 | Hagai et al. ............... 375/240.12 |
| 7,801,218 | B2 | 9/2010 | Olivier et al. |
| 8,270,480 | B2 * | 9/2012 | Yin et al. .................. 375/240.12 |
| 2004/0008775 | A1 * | 1/2004 | Panusopone et al. ..... 375/240.12 |
| 2004/0146105 | A1 * | 7/2004 | Hagai et al. .............. 375/240.12 |
| 2004/0236807 | A1 * | 11/2004 | Hsiung et al. .................. 708/200 |
| 2006/0013307 | A1 | 1/2006 | Olivier et al. |
| 2008/0080618 | A1 * | 4/2008 | Takagi et al. ............ 375/240.16 |
| 2009/0304087 | A1 * | 12/2009 | Shibahara et al. ........ 375/240.24 |
| 2010/0150240 | A1 * | 6/2010 | Wahadaniah et al. .... 375/240.15 |
| 2011/0274163 | A1 * | 11/2011 | Abe et al. ................. 375/240.03 |

FOREIGN PATENT DOCUMENTS

| | | | | |
|---|---|---|---|---|
| JP | | 2000-102017 | 4/2000 | |
| JP | | 2000102017 A | * 4/2000 | |
| JP | | 2003-198935 | 7/2003 | |
| JP | | 2006-025428 | 1/2006 | |
| JP | | 2008-124707 | 5/2008 | |
| WO | | 93/13626 | 7/1993 | |
| WO | WO 2007040197 A1 | * | 4/2007 | ............... H04N 7/32 |

OTHER PUBLICATIONS

A. Puri et al., "Adaptive Frame/Field Motion Compensated Video Coding", Signal Processing: Image Communications, AT&T Bell Laboratories, Crawfords Corner Road, Holmdel, NJ 07733, USA 1993, pp. 39-58.

Netravali et al., "Digital Pictures: Representation Compression and Standards", Second Edition, Plenum Press, New York, 1995, pp. 634-635.

Office Action dated Nov. 5, 2013 in the corresponding Chinese Application No. 201080002697.6, with English translation.

Translation of paragraphs [0028]-[0044] and Figs. 1-3, 5 and 6 of Japanese Patent Application Publication No. 2000-102017 published on Apr. 7, 2000.

* cited by examiner

IMAGE CODING METHOD, IMAGE CODING APPARATUS, PROGRAM, AND INTEGRATED CIRCUIT

BACKGROUND OF INVENTION

1. Technical Field

The present invention relates to an image coding method and an image coding apparatus for coding pictures.

2. Background Art

An interlaced sequence consists of two pictures captured and scanned at different times. The odd pixel rows of images are captured at a time different from the even pixel rows of images.

Most coding standards, e.g. MPEG-2 standard, MPEG-4 AVC standard, etc allow a picture coding structure of frame or field for coding of interlaced images. In some cases, it has been shown in prior art that frame-only coding may be better suited for some segments of the video, while other segments favor field-only coding.

Frame and field coding tools are described in NPL 1 and NPL 2. Adaptive methods for selecting picture level coding modes are not described in those two references.

CITATION LIST

Non Patent Literature

[NPL 1] Puri et al., "Adaptive Frame/Field Motion Compensated Video Coding", Signal Processing: Image Communications, 1993

[NPL 2] Netravali et al., "Digital Pictures: Representation Compression and Standards", Second Edition, Plenum Press, New York, 1995

SUMMARY OF INVENTION

The prior arts describe several methods for adaptively selecting frame coding or field coding for an image depending on characteristics of the image. In some of these prior arts, certain characteristics (e.g. spatial or temporal) have to be measured from an image prior to the decision of using either frame coding mode or field coding mode for the final coding of the image. However, such means of measurement process will require additional complexity in the implementation of a video encoder. The problem with the prior arts is that none of the prior arts provides a low complexity method to determine frame coding or field coding without involving measurements on the image to be coded.

Thus, the present invention has an object of providing an image coding method for appropriately determining one of frame coding and field coding while suppressing increase in the complexity.

In order to solve the problem, the image coding method according to an aspect of the present invention is an image coding method of coding pictures, and the method includes: coding a current picture included in the pictures; determining whether a picture next to the current picture is to be coded in frame coding or field coding, depending on motion information that is information for indicating a motion in the current picture; and coding the next picture in frame coding when it is determined in the determining that the next picture is to be coded in frame coding, and coding the next picture in field coding when it is determined in the determining that the next picture is to be coded in field coding.

Thereby, the coding type of the next picture is appropriately determined based on the motion information of the current picture. Furthermore, the motion information of the current picture is identified by information obtained by coding the current picture. Thus, increase in the complexity can be suppressed.

Furthermore, in the determining, one or more motion vectors may be obtained from one or more blocks included in the current picture, an average motion vector of the obtained one or more motion vectors may be calculated, and it may be determined that the next picture is to be coded in frame coding when the calculated average motion vector is less than a predefined threshold, and determined that the next picture is to be coded in field coding when the calculated average motion vector is more than or equal to the predefined threshold.

Thereby, the magnitude of the motion in the current picture is evaluated so that the coding type of the next picture is appropriately determined.

Furthermore, in the determining, a same-parity count and an opposite-parity count may be obtained from one or more blocks included in the current picture as the motion information, and it may be determined that the next picture is to be coded in frame coding when the same-parity count is more than or equal to the opposite-parity count, and determined that the next picture is to be coded in field coding when the same-parity count is less than the opposite-parity count, the same-parity count being the number of blocks belonging to a parity identical to a parity of a reference block to be referred to in the coding, and the opposite-parity count being the number of blocks belonging to a parity different from the parity of the reference block.

Thereby, the coding type of the next picture is determined based on the comparison between the same-parity count and the opposite-parity count. For example, when the opposite-parity count is larger, it is evaluated that the motion is larger, and field coding is selected. Thereby, the coding type of the next picture is appropriately determined.

Furthermore, in the determining, a same-parity count and an opposite-parity count may be obtained from one or more blocks included in the current picture as the motion information, and it may be determined that the next picture is to be coded in frame coding when a value obtained by subtracting the opposite-parity count from the same-parity count is more than or equal to a predefined threshold, and determined that the next picture is to be coded in field coding when the value obtained by the subtraction is less than the predefined threshold, the same-parity count being the number of blocks belonging to a parity identical to a parity of a reference block to be referred to in the coding, and the opposite-parity count being the number of blocks belonging to a parity different from the parity of the reference block.

Thereby, the coding type can be adjusted when a difference between the same-parity count and the opposite-parity count is smaller.

Furthermore, in the determining, a motion block count may be obtained from one or more blocks included in the current picture, and it may be determined that the next picture is to be coded in frame coding when the motion block count is less than a second predefined threshold, and determined that the next picture is to be coded in field coding when the motion block count is more than or equal to the second predefined threshold, the motion block count being the number of blocks having motion vectors more than or equal to a first predefined threshold.

Thereby, field coding is selected when a portion having a motion is larger in the current picture. Thereby, the coding type of the next picture is appropriately determined.

Furthermore, in the determining, a still block count may be obtained from one or more blocks included in the current picture, and it may be determined that the next picture is to be coded in frame coding when the still block count is more than or equal to a first predefined threshold, and determined that the next picture is to be coded in field coding when the still block count is less than the first predefined threshold, the still block count being the number of still blocks.

Thereby, frame coding is selected when a portion that is being still is larger in the current picture. Thereby, the coding type of the next picture is appropriately determined.

Furthermore, in the determining, the number of blocks having motion vectors less than a second predefined threshold may be obtained from the one or more blocks as the still block count.

Thereby, a portion that is being still in the current picture is determined based on the motion vector.

Furthermore, in the determining, the number of blocks having flags indicating being still may be obtained from the one or more blocks as the still block count.

Thereby, a portion that is being still in the current picture is determined based on a flag set in the coding.

Furthermore, in the determining, a spatial-activity value may be obtained for each of one or more blocks included in the current picture, the motion information may be obtained only from blocks each having the spatial-activity value that is more than or equal to a predefined threshold among the one or more blocks, and it may be determined whether the next picture is to be coded in frame coding or field coding, depending on the obtained motion information.

Thereby, a portion having a higher spatial activity, that is, a portion having a higher precision of determining whether or not a block is moving is used for determining the coding type. Thereby, the motion in the current picture is appropriately determined so that the coding type of the next picture is appropriately determined.

Furthermore, in the determining, it may be determined whether the next picture in coding order is to be coded in frame coding or field coding.

Thereby, the precision of determining the coding type becomes higher.

Furthermore, in the determining, it may be determined whether the next picture in display order is to be coded in frame coding or field coding.

Thereby, the coding type is smoothly determined, and the coding is smoothly performed.

Furthermore, the image coding apparatus according to an aspect of the present invention may be an image coding apparatus that codes pictures, and the apparatus may include: a picture coding unit configured to code a current picture included in the pictures; and a coding type determining unit configured to determine whether a picture next to the current picture is to be coded in frame coding or field coding, depending on motion information that is information for indicating a motion in the current picture, wherein the picture coding unit may be configured to code the next picture in frame coding when the coding type determining unit determines that the next picture is to be coded in frame coding, and to code the next picture in field coding when the coding type determining unit determines that the next picture is to be coded in field coding.

Thereby, the image coding method according to the present invention is implemented as the image coding apparatus.

Furthermore, the program according to an aspect of the present invention may be a program for causing a computer to execute steps included in the image coding method.

Thereby, the image coding method according to the present invention is implemented as the program.

Furthermore, the integrated circuit according to an aspect of the present invention may be an integrated circuit that codes pictures, and the circuit may include: a picture coding unit configured to code a current picture included in the pictures; and a coding type determining unit configured to determine whether a picture next to the current picture is to be coded in frame coding or field coding, depending on motion information that is information for indicating a motion in the current picture, wherein the picture coding unit may be configured to code the next picture in frame coding when the coding type determining unit determines that the next picture is to be coded in frame coding, and to code the next picture in field coding when the coding type determining unit determines that the next picture is to be coded in field coding.

Thereby, the image coding method according to the present invention is implemented as the integrated circuit.

The increase in complexity for determining one of frame coding and field coding is suppressed according to the present invention.

DETAILED DESCRIPTION OF INVENTION

Embodiment 1

Figure 1:
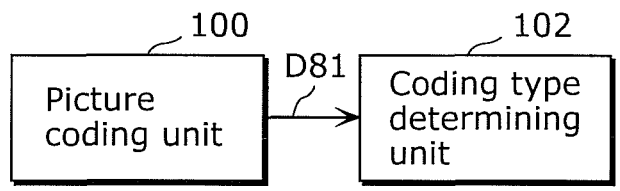
FIG. 1 illustrates a configuration of an image coding apparatus according to Embodiment 1 in the present invention.

FIG. 1 illustrates a configuration of an image coding apparatus according to Embodiment 1. The image coding apparatus according to Embodiment 1 includes a picture coding unit 100 and a coding type determining unit 102. The picture coding unit 100 codes a current picture with video coding tools and outputs a signal D81 indicating information of the current picture. The coding type determining unit 102 reads the signal D81, and determines a coding type of the next picture, that is, one of frame coding and field coding as the coding type of the picture next to the current picture.

Figure 2:
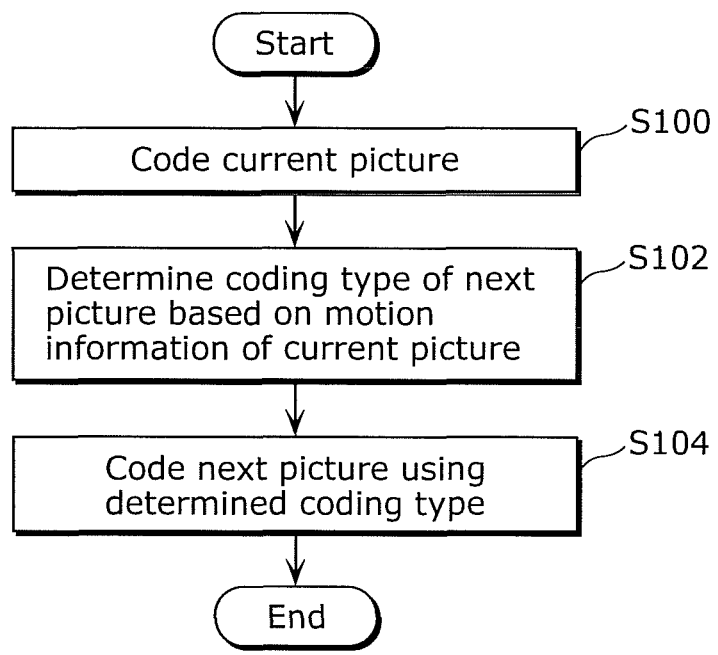
FIG. 2 is a flowchart indicating image coding processes according to Embodiment 1 in the present invention.

FIG. 2 is a flowchart indicating image coding processes performed by the image coding apparatus in FIG. 1. First, the picture coding unit 100 codes a current picture (S100). Next, the coding type determining unit 102 obtains motion information of the current picture, and determines one of frame coding and field coding as the coding type of the next picture (S102). Next, the picture coding unit 100 performs coding processes for the next picture, using the selected picture coding type (S104).

Figure 3:
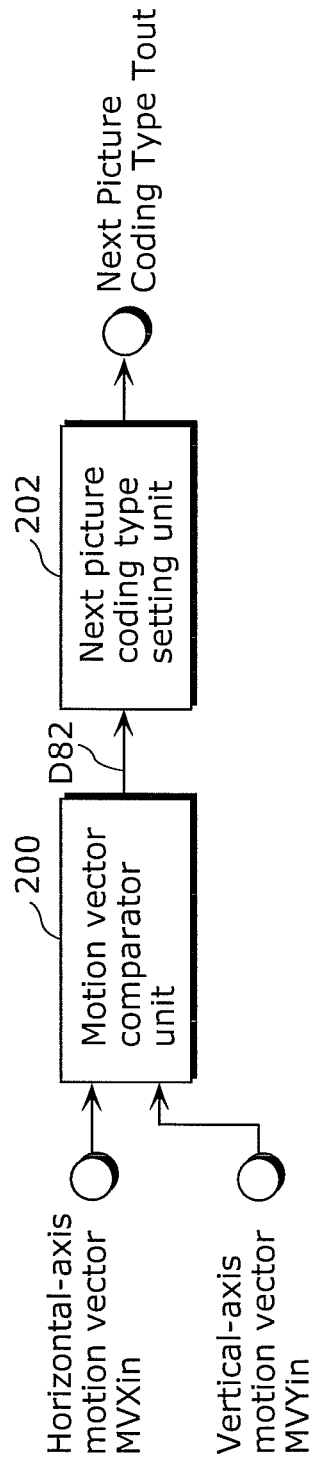
FIG. 3 illustrates a configuration of the coding type determining unit according to Embodiment 1 in the present invention.

FIG. 3 illustrates a configuration of the coding type determining unit 102 according to Embodiment 1. The coding type determining unit 102 includes a motion vector comparator unit 200 and a next picture coding type setting unit 202.

The motion vector comparator unit 200 receives an average horizontal-axis motion vector MVXin and an average vertical-axis motion vector MVYin from the coding processes on the current picture. The motion vector comparator unit 200 compares MVXin with a first predefined threshold value, compares MVYin with a second predefined threshold value, and outputs a true or false signal D82.

The next picture coding type setting unit 202 takes in the signal D82, sets the next picture coding type to frame coding when D82 is true or sets it to field coding when D1 is false, and outputs Next Picture Coding Type Tout.

Figure 4:
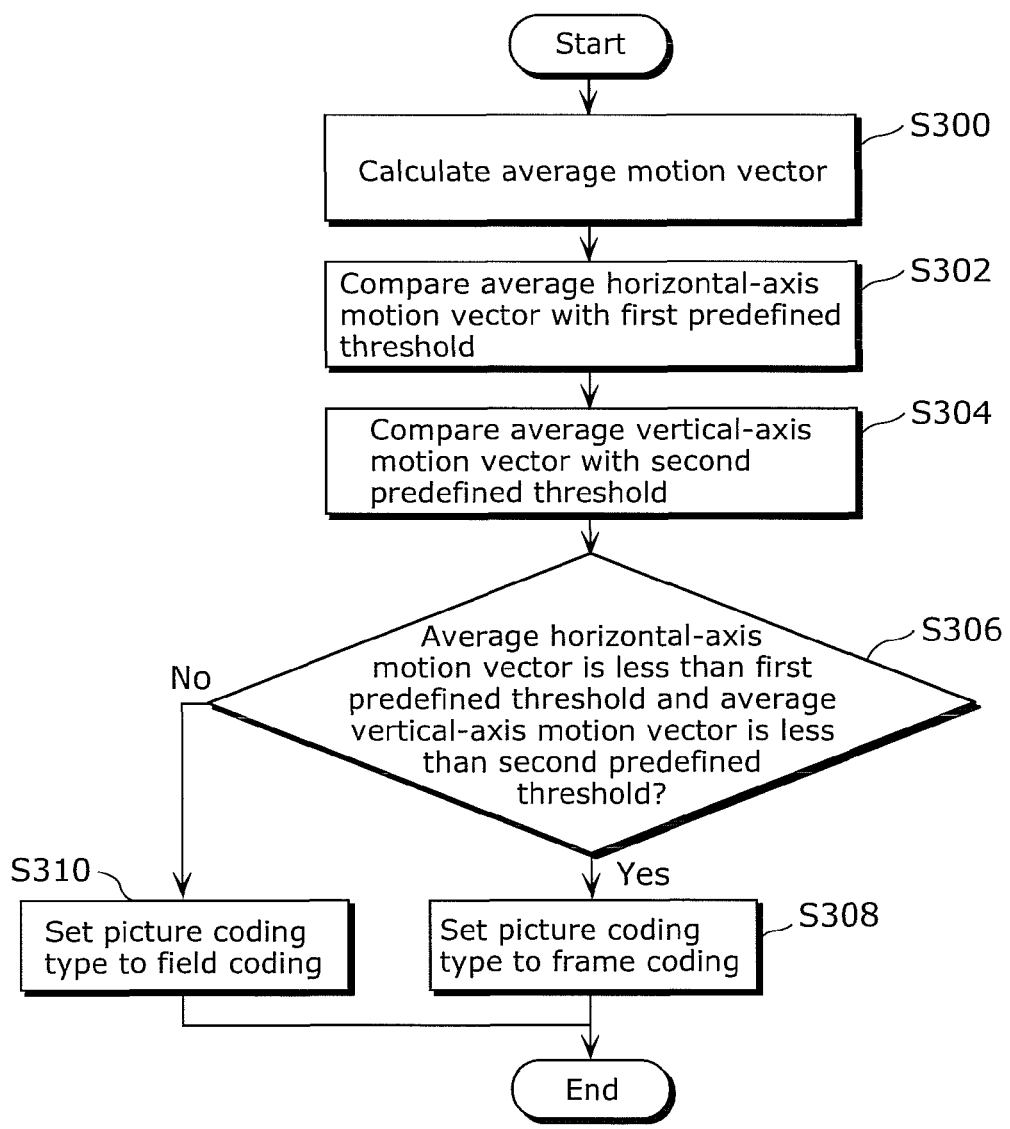
FIG. 4 is a flowchart indicating the coding type determining process according to Embodiment 1 in the present invention.

FIG. 4 is a flowchart indicating details of the coding type determining process (S102) according to Embodiment 1.

First, the picture coding unit 100 calculates the average motion vector during coding of the current picture (S300). Here, the coding type determining unit 102 may calculate the average motion vector.

Next, the motion vector comparator unit 200 compares the calculated average horizontal-axis motion vector with a first predefined threshold (S302). Next, the motion vector comparator unit 200 compares the calculated average vertical-axis motion vector with a second predefined threshold (S304).

Then, the motion vector comparator unit 200 checks if the average horizontal-axis motion vector is less than the first predefined threshold, and if the average vertical-axis motion vector is less than the second predefined threshold (S306).

If both are true (Yes at S306), the next picture coding type setting unit 202 sets the picture coding type of the next picture to frame coding (S308). Otherwise (No at S306), the next picture coding type setting unit 202 sets the picture coding type of the next picture to field coding (S310).

As described above, the image coding apparatus according to Embodiment 1 determines the coding type of the next picture based on the motion information of the current picture. For example, the image coding apparatus according to Embodiment 1 determines the coding type of the next picture as field coding when the current picture has a large motion. Furthermore, the motion information of the current picture is based on information to be generated when the current picture is coded. Thus, the image coding apparatus according to Embodiment 1 can appropriately determine the coding type while suppressing increase in the complexity.

Although Embodiment 1 exemplifies a case where the coding type of the next picture is determined based on an average motion vector, the coding type may be determined base on other motion information.

Furthermore, although the image coding apparatus according to Embodiment 1 evaluates the average motion vector, depending on the horizontal axis direction and the vertical axis direction, the average motion vector does not have to be separated into the horizontal axis direction and the vertical axis direction. In other words, the coding type of the next picture may be determined based on the magnitude of a motion vector, regardless of the direction of the motion vector.

Embodiment 2

The image coding apparatus according to Embodiment 2 determines the coding type of the next picture using parity between a current picture and a reference picture. The parity is an attribute indicating whether a picture is a top field or a bottom field. The reference picture is identified for each macroblock. A macroblock is an image coding unit, and contains an N×M array of samples. Examples of N and M are 16 and 16, respectively.

If the current picture is a top field, then if the reference picture that the current macroblock refers to is also a top field, the current picture and the reference picture have the same-parity. If both are bottom fields, it is also considered that the current picture and the reference picture have the same-parity. If the reference picture has different parity compared to the current macroblock, then it is considered that they have different parities. In case of a frame-coded macroblock, the field parity of the selected reference picture is taken to be the same-parity as that of the current macroblock.

The configuration of the image coding apparatus according to Embodiment 2 has the same configuration as that of the image coding apparatus according to Embodiment 1 in FIG. 1. Furthermore, image coding processes according to Embodiment 2 are the same as those according to Embodiment 1 in FIG. 2. Embodiment 2 differs from Embodiment 1 by a configuration of the coding type determining unit 102 and the coding type determining process (S102).

Figure 5:
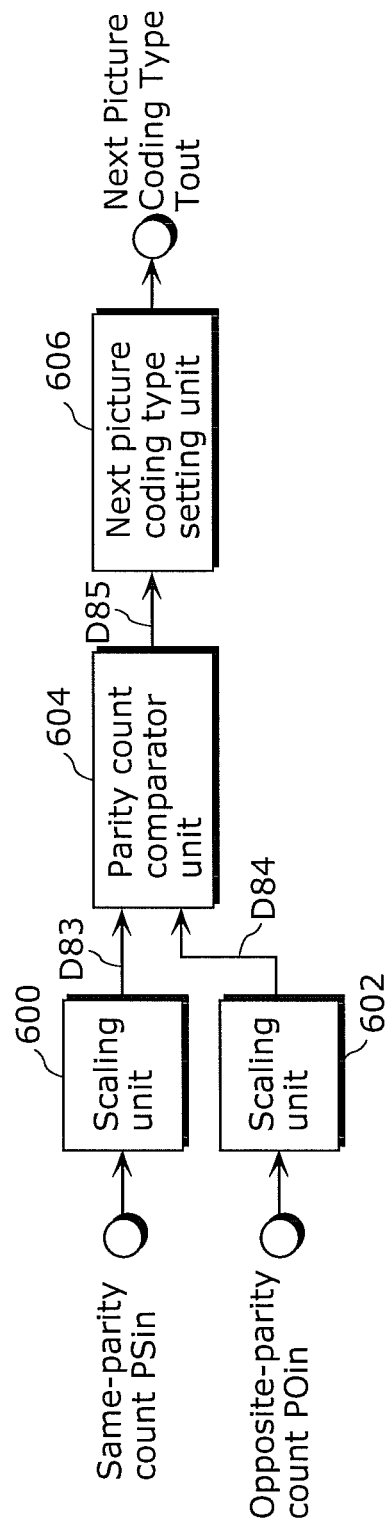
FIG. 5 illustrates a configuration of the coding type determining unit according to Embodiment 2 in the present invention.

FIG. 5 illustrates the configuration of the coding type determining unit 102 according to Embodiment 2. The coding type determining unit 102 includes two scaling units 600 and 602, a parity count comparator unit 604, and a next picture coding type setting unit 606.

The scaling unit 600 receives a same-parity count PSin from the coding processes on the current picture, scales it, and outputs a signal D83. The scaling unit 602 receives an opposite-parity count POin from the coding processes on the current picture, scales it, and outputs a signal D84.

The parity count comparator unit 604 takes in D83 and D84, compares them, and outputs a true or false signal D85. The next picture coding type setting unit 606 takes in the signal D85, sets the next picture coding type to frame coding if D85 is true or sets it to field coding if D85 is false, and outputs Next Picture Coding Type Tout.

Figure 6:
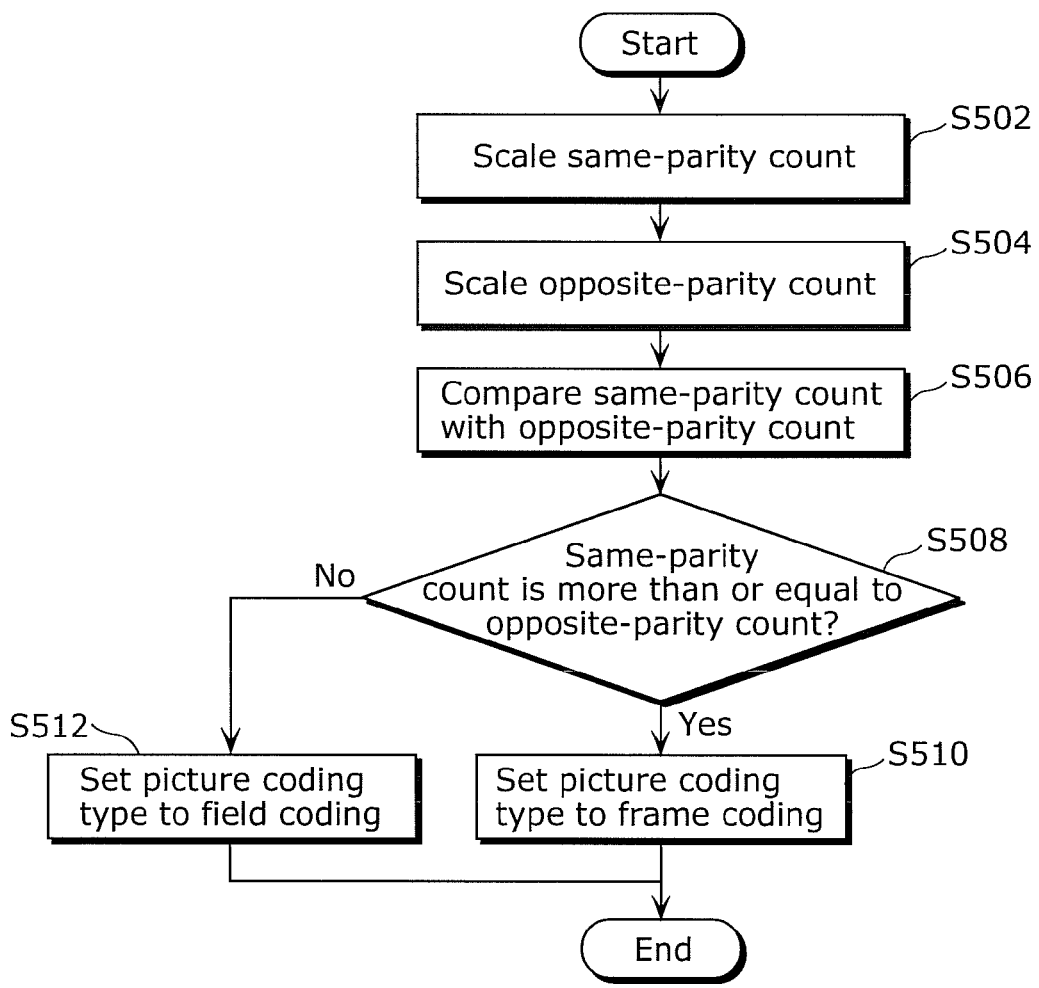
FIG. 6 is a flowchart indicating the coding type determining process according to Embodiment 2 in the present invention.

FIG. 6 is a flowchart indicating details of the coding type determining process (S102) according to Embodiment 2.

First, the scaling unit 600 performs scaling of the same-parity count (S502). Furthermore, the scaling unit 602 performs scaling of the opposite-parity count (S504).

Next, the parity count comparator unit 604 compares the scaled same-parity count with the scaled opposite-parity count (S506). Next, the parity count comparator unit 604 checks if the scaled same-parity count is more than or equal to the scaled opposite-parity count (S508).

If true (Yes at S508), the next picture coding type setting unit 606 sets the picture coding type of the next picture to frame coding (S510). Otherwise (No at S508), the next picture coding type setting unit 606 sets the picture coding type of the next picture to field coding (S512).

As described above, the image coding apparatus according to Embodiment 2 determines the coding type of the next picture based on the same-parity count or the opposite-parity count. For example, when the same-parity count is more than the opposite-parity count, the current picture probably has a small motion. When the opposite-parity count is more than the same-parity count, the current picture probably has a large motion. Thus, when the same-parity count is more than the opposite-parity count, frame coding is selected. When the opposite-parity count is more than the same-parity count, field coding is selected.

Thereby, the image coding apparatus according to Embodiment 2 can appropriately determine the coding type while suppressing increase in the complexity.

When a value obtained by subtracting the opposite-parity count from the same-parity count is less than a predefined threshold, the image coding apparatus according to Embodiment 2 may select field coding. When the value is more than or equal to the predefined threshold, the image coding apparatus may select frame coding. Thereby, the criteria of comparison between the same-parity count and the opposite-parity count are adjusted. Furthermore, the image coding apparatus according to Embodiment 2 may weigh the opposite-parity count and the same-parity count for the comparison.

Furthermore, when a difference between the opposite-parity count and the same-parity count is smaller, the image coding apparatus may determine the coding type according to a determination method described in other Embodiments.

Embodiment 3

The image coding apparatus according to Embodiment 3 determines the coding type of the next picture based on a motion block count of the current picture.

The configuration of the image coding apparatus according to Embodiment 3 has the same configuration as that of the image coding apparatus according to Embodiment 1 in FIG. 1. Furthermore, image coding processes according to Embodiment 3 are the same as those according to Embodiment 1 in FIG. 2. Embodiment 3 differs from Embodiment 1 by the configuration of the coding type determining unit 102 and the coding type determining process (S102).

Figure 7:
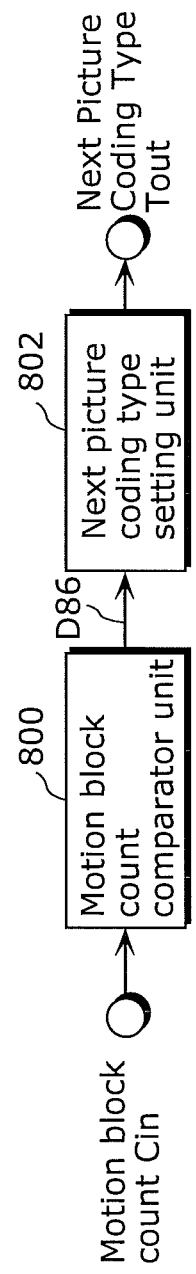
FIG. 7 illustrates a configuration of the coding type determining unit according to Embodiment 3 in the present invention.

FIG. 7 illustrates the configuration of the coding type determining unit 102 according to Embodiment 3. The coding type determining unit 102 includes a motion block count comparator unit 800 and a next picture coding type setting unit 802.

The motion block count comparator unit 800 receives a motion block count Cin from the coding processes on the current picture, compares it with a third predefined threshold value, and outputs a true or false signal D86. The next picture coding type setting unit 802 takes in the signal D86, sets the next picture coding type to frame coding if D86 is true or sets it to field coding if D86 is false, and outputs Next Picture Coding Type Tout.

Figure 8:
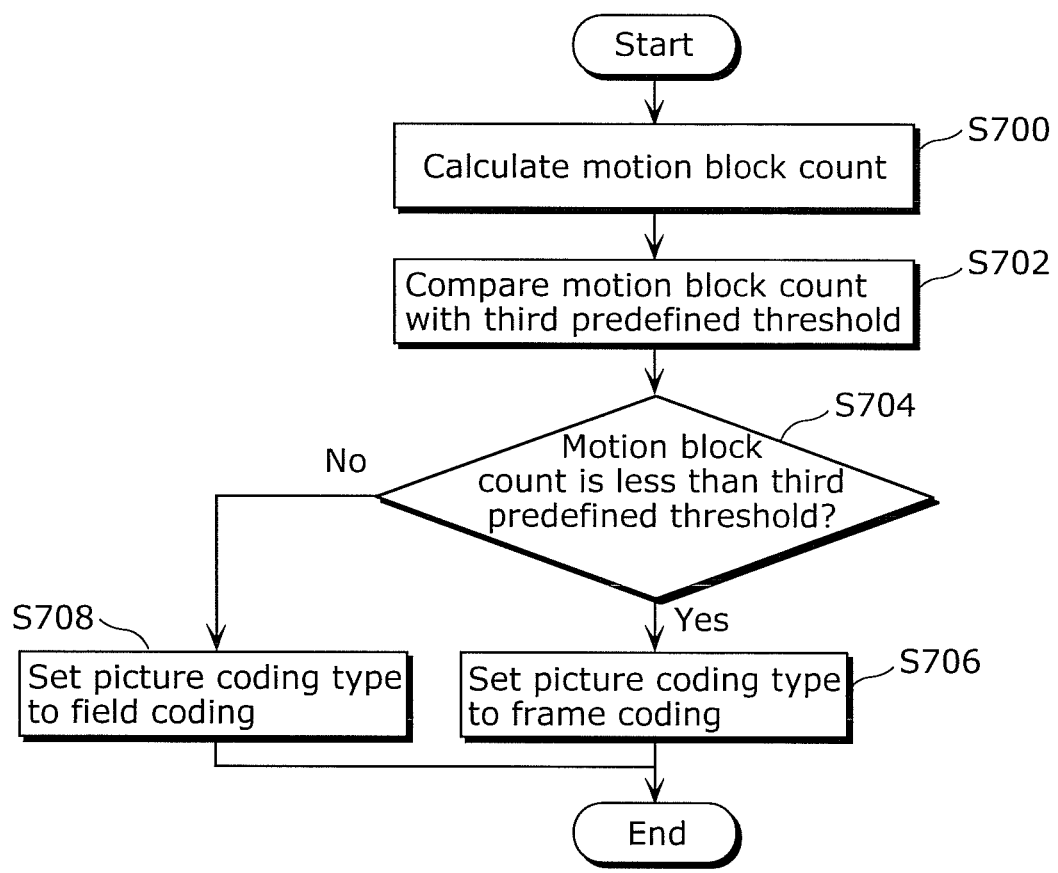
FIG. 8 is a flowchart indicating the coding type determining process according to Embodiment 3 in the present invention.

FIG. 8 is a flowchart indicating details of the coding type determining process (S102) according to Embodiment 3.

The picture coding unit 100 calculates the motion block count during coding of the current picture (S700). For example, the picture coding unit 100 calculates the number of blocks each having a motion vector more than or equal to a predefined threshold, as the motion block count. Here, the coding type determining unit 102 may calculate the motion block count.

The motion block count comparator unit 800 compares the motion block count with the third predefined threshold (S702). The motion block count comparator unit 800 checks if the motion block count is less than the third predefined threshold (S704).

If true (Yes at S704), the next picture coding type setting unit 802 sets the picture coding type of the next picture to frame coding (S706). Otherwise (No at S704), the next picture coding type setting unit 802 sets the picture coding type of the next picture to field coding (S708).

As described above, the image coding apparatus according to Embodiment 3 determines the coding type of the next picture based on the motion block count. In other words, the coding type of the next picture is determined according to a rate in a portion where the current picture has a motion. For example, when a small portion has a large motion whereas most of other portions do not have the motion in the current picture, the image coding apparatus according to Embodiment 3 selects optimal frame coding as a whole.

Thus, the image coding apparatus according to Embodiment 3 can appropriately determine the coding type while suppressing increase in the complexity.

Embodiment 4

The image coding apparatus according to Embodiment 4 determines the coding type of the next picture based on the average motion vector of the current picture and parity information.

The configuration of the image coding apparatus according to Embodiment 4 has the same configuration as that of the image coding apparatus according to Embodiment 1 in FIG. 1. Furthermore, image coding processes according to Embodiment 4 are the same as those according to Embodiment 1 in FIG. 2. Embodiment 4 differs from Embodiment 1 by the configuration of the coding type determining unit 102 and the coding type determining process (S102).

Figure 9:
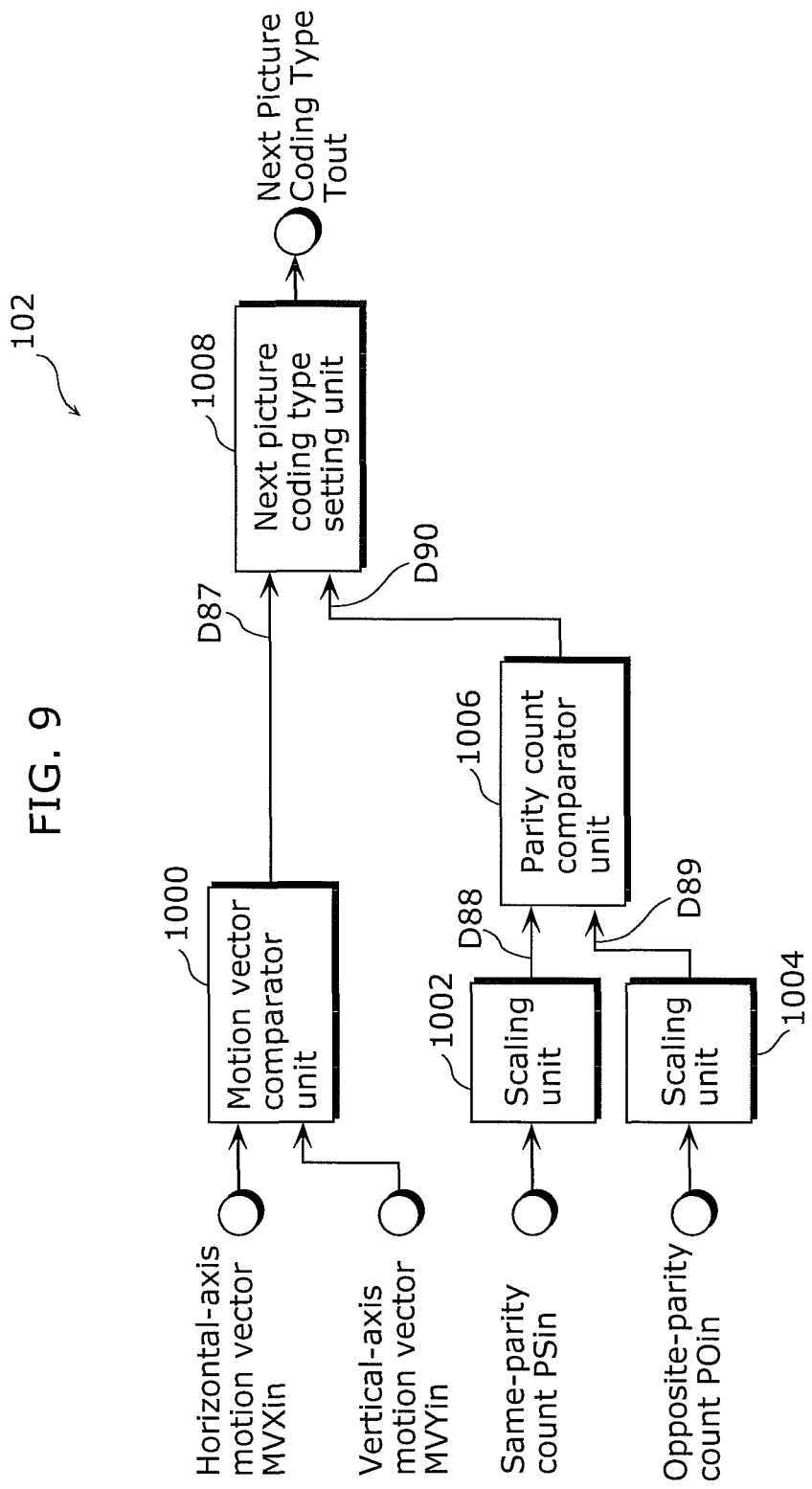
FIG. 9 illustrates a configuration of the coding type determining unit according to Embodiment 4 in the present invention.

FIG. 9 illustrates the configuration of the coding type determining unit 102 according to Embodiment 4. The coding type determining unit 102 includes a motion vector comparator unit 1000, two scaling units 1002 and 1004, a parity count comparator unit 1006, and a next picture coding type setting unit 1008.

The motion vector comparator unit 1000 receives an average horizontal-axis motion vector MVYin and an average vertical-axis motion vector MVYin from the coding processes on the current picture. The motion vector comparator unit 1000 compares MVXin with a first predefined threshold value, compares MVYin with a second predefined threshold value, and outputs a true or false signal D87.

The scaling unit 1002 receives a same-parity count PSin from the coding processes of the current picture, scales it, and outputs a signal D88. The scaling unit 1004 receives an opposite-parity count POin from the coding processes on the current picture, scales it, and outputs a signal D89.

The parity count comparator unit 1006 takes in D88 and D89, compares them, and outputs a true or false signal D90.

The next picture coding type setting unit 1008 takes in the signals D87 and D90, sets the next picture coding type to frame coding if D87 and D90 are true or sets the coding type to field coding if D87 and D90 are false, and outputs Next Picture Coding Type Tout.

Figure 10:
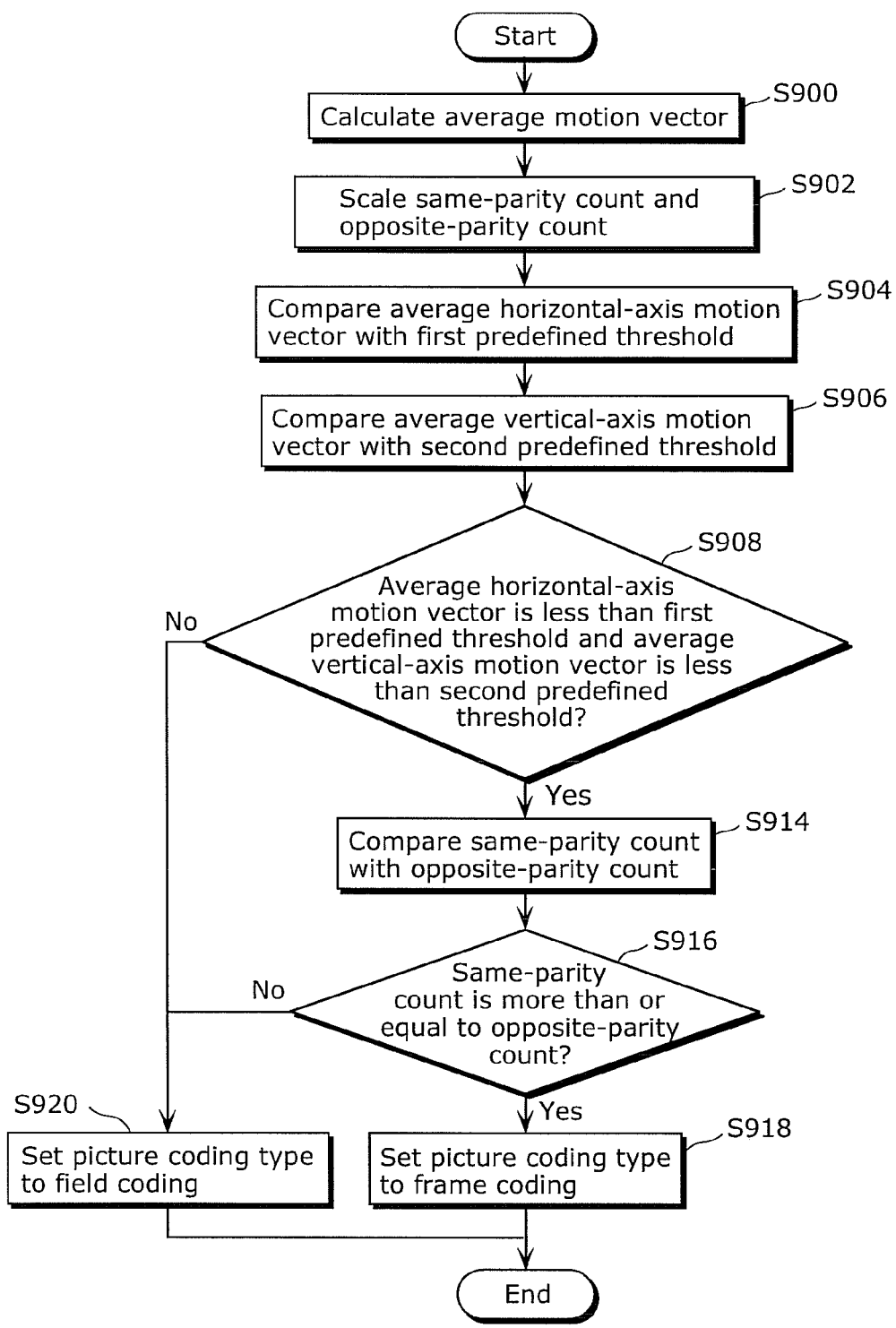
FIG. 10 is a flowchart indicating the coding type determining process according to Embodiment 4 in the present invention.

FIG. 10 is a flowchart indicating details of the coding type determining process (S102) according to Embodiment 4.

First, the picture coding unit 100 calculates the average motion vector during coding of the current picture (S900). Here, the coding type determining unit 102 may calculate the average motion vector.

First, the scaling unit 1002 performs scaling of the same-parity count. Furthermore, the scaling unit 1004 performs scaling of the opposite-parity count (S902).

The motion vector comparator unit 1000 compares the calculated average horizontal-axis motion vector with a first predefined threshold (S904). Furthermore, the motion vector comparator unit 1000 compares the calculated average vertical-axis motion vector with a second predefined threshold (S906).

Then, the motion vector comparator unit 1000 checks if the average horizontal-axis motion vector is less than the first predefined threshold, and if the average vertical-axis motion vector is less than the second predefined threshold (S908).

Otherwise (No at S908), the next picture coding type setting unit 1008 sets the picture coding type of the next picture to field coding (S920).

If true (Yes at S908), the parity count comparator unit 1006 compares the scaled same-parity count with the scaled opposite-parity count (S914). Next, the parity count comparator unit 1006 checks if the scaled same-parity count is more than or equal to the scaled opposite-parity count (S916).

If true (Yes at S916), the next picture coding type setting unit 1008 sets the picture coding type of the next picture to frame coding (S918). Otherwise (No at S916), the next picture coding type setting unit 1008 sets the picture coding type of the next picture to field coding (S920).

As described above, the image coding apparatus according to Embodiment 4 determines the coding type of the next picture based on the average motion vector of the current picture and the parity information. Thereby, the image coding apparatus according to Embodiment 4 can appropriately determine the coding type.

Embodiment 5

The image coding apparatus according to Embodiment 5 determines the coding type of the next picture based on an average motion vector of the current picture and a motion block count.

The configuration of the image coding apparatus according to Embodiment 5 has the same configuration as that of the image coding apparatus according to Embodiment 1 in FIG. 1. Furthermore, image coding processes according to Embodiment 5 are the same as those according to Embodiment 1 in FIG. 2. Embodiment 5 differs from Embodiment 1 by the configuration of the coding type determining unit 102 and the coding type determining process (S102).

Figure 11:
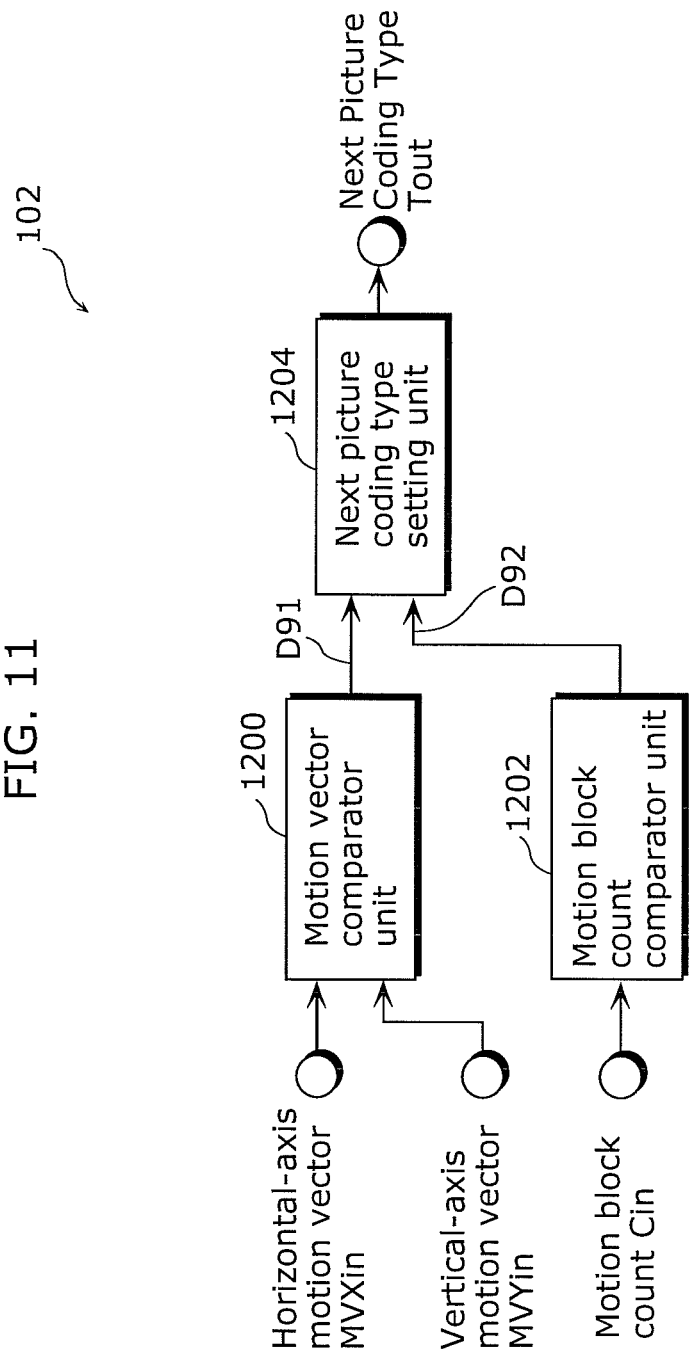
FIG. 11 illustrates a configuration of the coding type determining unit according to Embodiment 5 in the present invention.

FIG. 11 illustrates the configuration of the coding type determining unit 102 according to Embodiment 5. The coding type determining unit 102 includes a motion vector comparator unit 1200, a motion block count comparator unit 1202, and a next picture coding type setting unit 1204.

The motion vector comparator unit 1200 receives an average horizontal-axis motion vector MVXin and an average vertical-axis motion vector MVYin from the coding processes on the current picture. The motion vector comparator unit 1200 compares MVXin with a first predefined threshold value, compares MVYin with a second predefined threshold value, and outputs a true or false signal D91.

The motion block count comparator unit 1202 receives a motion block count Cin from the coding processes on the current picture, compares it with a third predefined threshold value, and outputs a true or false signal D92.

The next picture coding type setting unit 1204 takes in the signals D91 and D92, sets the next picture coding type to frame coding if D91 and D92 are true or sets the coding type to field coding if one of D91 and D92 is false, and outputs Next Picture Coding Type Tout.

Figure 12:
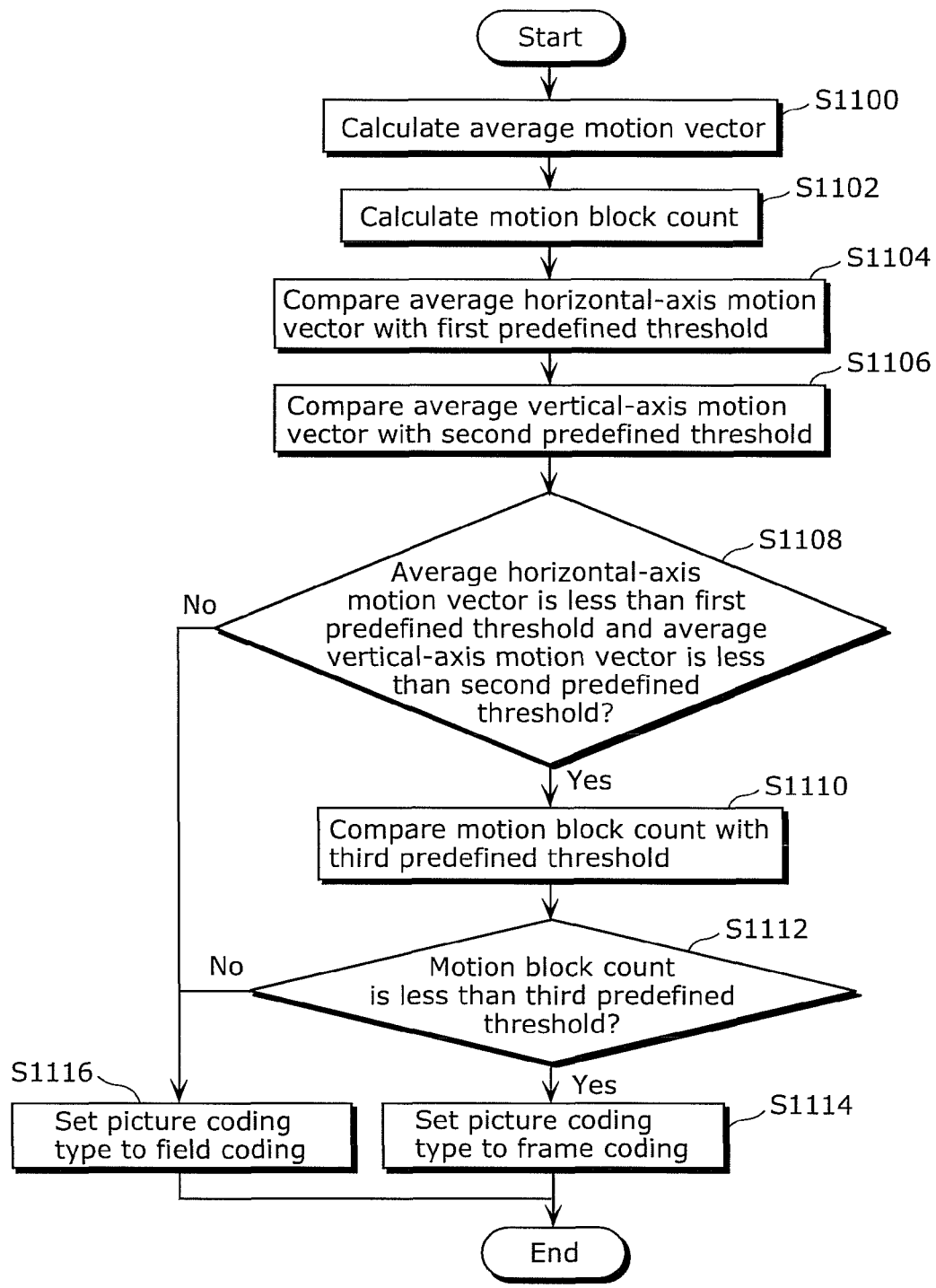
FIG. 12 is a flowchart indicating the coding type determining process according to Embodiment 5 in the present invention.

FIG. 12 is a flowchart indicating details of the coding type determining process (S502) according to Embodiment 5.

First, the picture coding unit 100 calculates an average motion vector during coding of the current picture (S1100). Here, the coding type determining unit 102 may calculate the average motion vector.

Next, the picture coding unit 100 calculates the motion block count during coding of the same current picture (S1102). Here, the coding type determining unit 102 may calculate the motion block count.

The motion vector comparator unit 1200 compares the calculated average horizontal-axis motion vector with a first predefined threshold (S1104). Furthermore, the motion vector comparator unit 1200 compares the calculated average vertical-axis motion vector with a second predefined threshold (S1106). Then, the motion vector comparator unit 1200 checks if the average horizontal-axis motion vector is less than the first predefined threshold, and if the average vertical-axis motion vector is less than the second predefined threshold (S1108).

Otherwise (No at S1108), the next picture coding type setting unit 1204 sets the picture coding type of the next picture to field coding (S1116).

If true (Yes at S1108), the motion block count comparator unit 1200 compares the motion block count with a third predefined threshold (S1110). The motion block count comparator unit 1202 checks if the motion block count is less than the third predefined threshold (S1112).

If true (Yes at S1112), the next picture coding type setting unit 1204 sets the picture coding type of the next picture to frame coding (S1114). Otherwise (No at S1112), the next picture coding type setting unit 1204 sets the picture coding type of the next picture to field coding (S1116).

As described above, the image coding apparatus according to Embodiment 5 determines the coding type of the next picture based on an average motion vector of the current picture and a motion block count. Thereby, the image coding apparatus according to Embodiment 5 can appropriately determine the coding type.

Embodiment 6

The image coding apparatus according to Embodiment 6 determines the coding type of the next picture based on a still block count of the current picture.

The configuration of the image coding apparatus according to Embodiment 6 has the same configuration as that of the image coding apparatus according to Embodiment 1 in FIG. 1. Furthermore, image coding processes according to Embodiment 6 are the same as those according to Embodiment 1 in FIG. 2. Embodiment 6 differs from Embodiment 1 by the configuration of the coding type determining unit 102 and the coding type determining process (S102).

Figure 13:
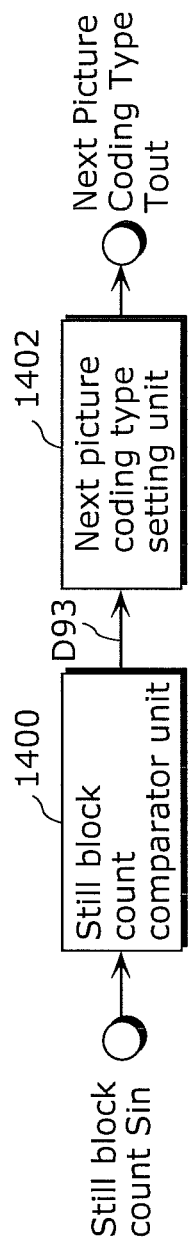
FIG. 13 illustrates a configuration of the coding type determining unit according to Embodiment 6 in the present invention.

FIG. 13 illustrates the configuration of the coding type determining unit 102 according to Embodiment 6.

The coding type determining unit 102 includes a still block count comparator unit 1400 and a next picture coding type setting unit 1402.

The still block count comparator unit 1400 receives a still block count Sin from the coding processes of the current picture, compares it with a fourth predefined threshold value, and outputs a true or false signal D93.

The next picture coding type setting unit 1402 takes in the signal D93, sets the next picture coding type to frame coding if D93 is true or sets the coding type to field coding if D93 is false, and outputs Next Picture Coding Type Tout.

Figure 14:
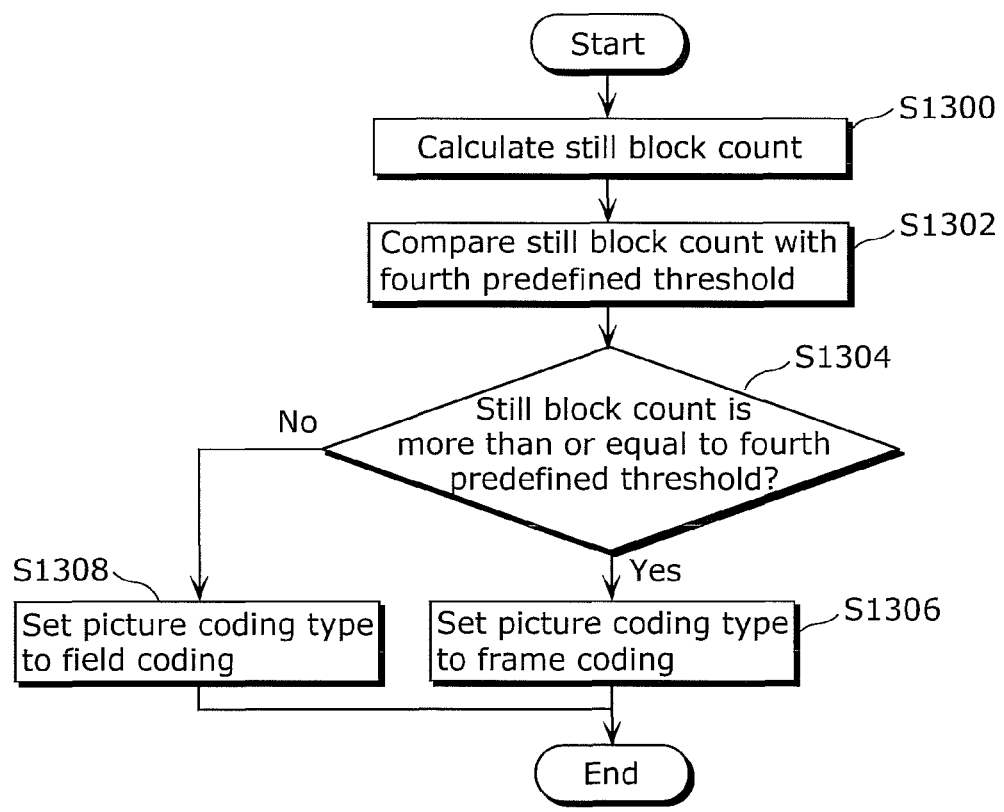
FIG. 14 is a flowchart indicating the coding type determining process according to Embodiment 6 in the present invention.

FIG. 14 is a flowchart indicating details of the coding type determining process (S102) according to Embodiment 6.

The picture coding unit 100 calculates the still block count during coding of the current picture (S1300). The still block count is, for example, the number of blocks to which ColZeroFlag is set in the current picture. ColZeroFlag is a flag assigned to a block having a small motion. Furthermore, the still block count may be the number of blocks each having a motion vector less than a predefined threshold in the current picture.

Here, the coding type determining unit 102 may calculate the still block count.

The still block count comparator unit 1400 compares the still block count with the fourth predefined threshold (S1302). The motion block count comparator unit 1400 checks if the still block count is more than or equal to the fourth predefined threshold (S1304).

If true (Yes at S1304), the next picture coding type setting unit 1402 sets the picture coding type of the next picture to frame coding (S1306). Otherwise (No at S1304), the next picture coding type setting unit 1402 sets the picture coding type of the next picture to field coding (S1308).

As described above, the image coding apparatus according to Embodiment 6 determines the coding type of the next picture based on the still block count. Thereby, the image coding apparatus according to Embodiment 6 can appropriately determine the coding type while suppressing increase in the complexity.

Embodiment 7

The image coding apparatus according to Embodiment 7 sequentially codes macroblocks included in the current picture. Furthermore, the image coding apparatus according to Embodiment 7 calculates an average motion vector, a motion block count, a still block count, a same-parity count, and an opposite-parity count.

Figure 15:
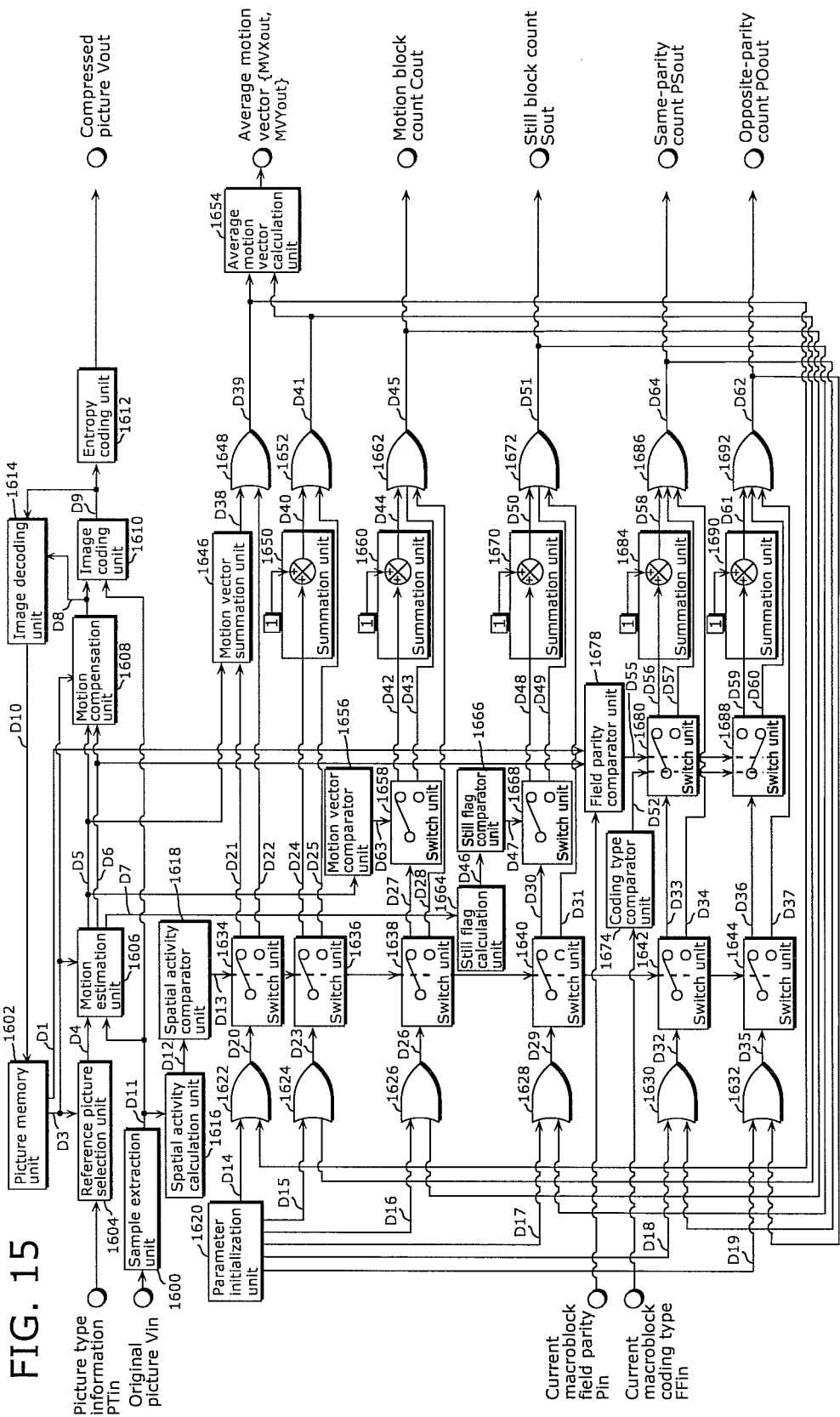
FIG. 15 illustrates a configuration of the image coding apparatus according to Embodiment 7 in the present invention.

FIG. 15 illustrates a configuration of an image coding apparatus according to Embodiment 7.

A sample extraction unit 1600 receives a current original picture as an input Vin, and then extracts and outputs an M×N array of original samples D11. Examples of M and N values are 16 and 16, respectively.

A reference picture selection unit 1604 accepts picture type information PTin indicating one of field coding and frame coding, stores a set of reference pictures D3 as inputs, and outputs a set of one or more selected reference pictures D4 to be used in a motion estimation process.

A motion estimation unit 1606 takes the set of reference pictures D4 and the M×N array of original samples D11, performs motion estimation on the reference pictures, and outputs a set of motion vectors D5, a set of reference indexes D6, and intermediate motion estimation information D7 which indicates that the motion activity of the current macroblock is low. An example of such intermediate motion estimation information D7 is ColZeroFlag in the case of H.264/MPEG-4 AVC video coding standard.

A motion compensation unit 1608 takes the set of reference indexes D6, the set of motion vectors D5, and the set of reference pictures D3. The motion compensation unit 1608 outputs an M×N array of inter-predicted samples D8.

An image coding unit 1610 then takes the M×N array of original samples D11 as inputs. In some implementations of the present invention, the image coding unit also takes the M×N array of inter-predicted samples D8 as an additional input to be used for the coding of the M×N target macroblock. The image coding unit 1610 then performs image coding processes on the target macroblock, and outputs an M×N array of quantized residuals D9 to an entropy coding unit 1612 and an image decoding unit 1614.

The entropy coding unit 1612 codes the M×N array of quantized residuals D9, and outputs a compressed picture bitstream Vout. The image decoding unit 1614 decodes and reconstructs the quantized residuals D9. The image coding unit 1610 may take the M×N array of inter-predicted samples D8 to reconstruct the M×N array of macroblock samples.

The image decoding unit 1614 finally outputs the M×N array of reconstructed samples D10 and stores the reconstructed samples into the picture memory unit 1602.

The present invention utilizes the information generated during the above macroblock coding processes to determine the coding type of one or more subsequent pictures.

A parameter initialization unit 1620 is activated at the start of picture (at the first macroblock of the current target picture). The parameter initialization unit 1620 sets the sum of motion vectors D14 to zero, the motion vector count D15 to zero, the motion block count D16 to zero, the still block count D17 to zero, the same-parity count D18 to zero, and the opposite parity count D19 to zero. The parameter initialization unit 1620 does not output any signals at any instances other than the start of picture. For simplicity of notation, both horizontal and vertical components of motion vector information are taken to be contained in the sum of motion vectors D14.

Each OR gate 1622, 1624, 1626, 1628, 1630, or 1632 connects one of two input signals to the output signal (D20, D23, D26, D29, D32 or D35) depending on which input signal is available.

At instances other than the start of picture, the available input signals (D39, D41, D45, D51, D64, and D62) are feedback signals generated by possible modification of the initial signals (D14, D15, D16, D17, D18 and D19).

A spatial activity calculation unit 1616 takes in an M×N array of original samples D11 as an input and calculates a spatial activity value D12, which indicates the amount of variation/fluctuation among the M×N original sample values. A spatial activity comparator unit 1618 takes in the spatial activity value D12 and compares it to a pre-determined spatial activity threshold. If the spatial activity value D12 is less than the pre-determined spatial activity threshold, a control signal D13 is set to 1. Otherwise, the control signal D13 is set to 0.

The control signal D13 is used to control switch units 1634, 1636, 1638, 1640, 1642 and 1644.

If the control signal D13 is 1, the switch unit 1634 connects D20 to D22, the switch unit 1636 connects D23 to D25, the switch unit 1638 connects D26 to D28, the switch unit 1640 connects D29 to D31, the switch unit 1642 connects D32 to D34, and the switch unit 1644 connects D35 to D37.

If the control signal D13 is 0, the switch unit 1634 connects D20 to D21, the switch unit 1636 connects D23 to D24, the switch unit 1638 connects D26 to D27, the switch unit 1640 connects D29 to D30, the switch unit 1642 connects D32 to D33, and the switch unit 1644 connects D35 to D36.

The spatial activity evaluation process may not be performed. In such cases, the spatial activity calculation unit 1616, the spatial activity comparator unit 1618, and the switch units 1634, 1636, 1638, 1640, 1642 and 1644 may not be present.

In addition, a sum of motion vectors D20 is permanently connected to D21, a sum of motion vectors D23 is permanently connected to D24, a motion block count D26 is permanently connected to D27, a still block count D29 is permanently connected to D30, a same-parity count D32 is permanently connected to D33, and an opposite-parity count D35 is permanently connected to D36.

The motion vector summation unit 1646 takes the set of motion vectors of the current macroblock D5 and the sum of motion vectors D21 as inputs. When there are more than one motion vector in the set of motion vectors D5, the motion vector summation unit 1646 internally calculates a single motion vector value to be added to the sum of motion vectors. Some examples of such calculation are simple averaging, weighted averaging, and sampling. The resulting single motion vector is then added to the sum of motion vectors D21 and the updated sum of motion vectors D38 is given as an output.

An OR gate unit 1648 connects D38 or D22 to an output of a sum of motion vectors D39, depending on which signal is available.

A summation unit 1650 increments the motion vector count D24 by one and outputs an updated motion vector count D40. The OR gate unit 1652 then connects either D40 or D25 to the output D41 depending on which signal is available.

An average motion vector calculation unit 1654 takes in a sum of motion vector D39 and a motion vector count D41 and calculates the average motion vectors {MVXout, MVYout} in horizontal and vertical directions. At the end of current picture coding, the final average motion vector can be used for determining the coding type of one or more subsequent pictures.

A motion vector comparator unit 1656 takes in the set of motion vectors D5 and compares it to a pre-determined motion vector threshold. The predefined threshold values for vertical and horizontal motion vector components may be set differently. If all motion vector values are less than the pre-determined motion vector threshold, an output signal D63 is set to 1. Otherwise, the D63 is set to 0.

The switch unit 1658 connects a motion block count D27 to an output of a motion block count D42 or D43 depending on the control signal D63. If D63 is 1, D27 is connected to D42. Otherwise, D27 is connected to D43.

The summation unit 1660 increments the motion block count D42 by one and outputs D44. An OR gate unit 1662 then connects either D44, D43 or D28 to a motion block count D45 depending on which signal is available. At the end of current picture coding, the final value of a motion block count can be used for determining the coding type of one or more subsequent pictures.

A still flag calculation unit 1664 takes in intermediate motion estimation information D7 and calculates a still flag D46. One example of such calculation for the case of H.264/MPEG-4 AVC video coding standard is shown in Equation 7 to be described later.

A still flag comparator unit 1666 then evaluates a value of the still flag D46. If the still flag D46 is 1, an output signal D47 is set to 1. Otherwise, the D47 is set to 0.

A switch unit 1668 connects a still block count D30 to a still block count D48 or D49 depending on the control signal D47. If D47 is 1, D30 is connected to D48. Otherwise, D30 is connected to D49.

The summation unit 1670 increments the still block count D48 by one and outputs D50. The OR gate unit 1672 then connects either D50, D49 or D31 to the still block count D51 depending on which signal is available. At the end of current picture coding, the final value of the still block count can be used for determining the coding type of one or more subsequent pictures.

The coding type comparator unit 1674 takes in current macroblock coding type information FFin and outputs a control signal D52. If the current macroblock is coded as a frame macroblock, D52 is set to 0. Otherwise (the current macroblock is coded as field macroblock), D52 is set to 1.

Even when the coding type of the current picture is frame coding, there are cases where the coding type is changed for each current macroblock. In other words, there are cases where the picture type information PTin is different from the current macroblock coding type information FFin.

The field parity comparator unit 1678 takes in the current macroblock field parity information Pin, the selected reference index D6, and the reference picture information D1. The field parity comparator unit 1678 then compares the field parity of the current macroblock with the field parity of the selected reference picture, and outputs a signal D55. If the field parity of the current macroblock is the same as the field parity of the selected reference picture, D55 is set to 1. Otherwise, the D55 is set to 0.

The switch unit 1680 connects the input of the same-parity count D33 to the same-parity count D56 or D57 depending on the control signals D52 and D55. If D52 is 1 and D55 is 1, D33 is connected to D56. Otherwise (D52 is 0 or D55 is 0), D33 is connected to D57.

A summation unit 1684 increments the same-parity count D56 by one and outputs D58. An OR gate unit 1686 then connects either D58, D57 or D34 to the same-parity count D64 depending on which signal is available.

The same control signals D52 and D55 are used for controlling a switch unit 1688, which connects the input of the opposite-parity count D36 to an output D59 or D60. If D52 is 1 and D55 is 0, the switch unit 1688 connects D36 to D59. Otherwise (D52 is 0 or D55 is 1), the switch unit 1688 connects D36 to D60.

A summation unit 1690 increments the opposite-parity count D59 by one and outputs D61. An OR gate unit 1692 then connects either D61, D60 or D37 to the opposite-parity count D62 depending on which signal is available. At the end of current picture coding, the final value of the same-parity count PSout and the opposite-parity count POout can be used for determining the coding type of one or more subsequent pictures.

Figure 16:
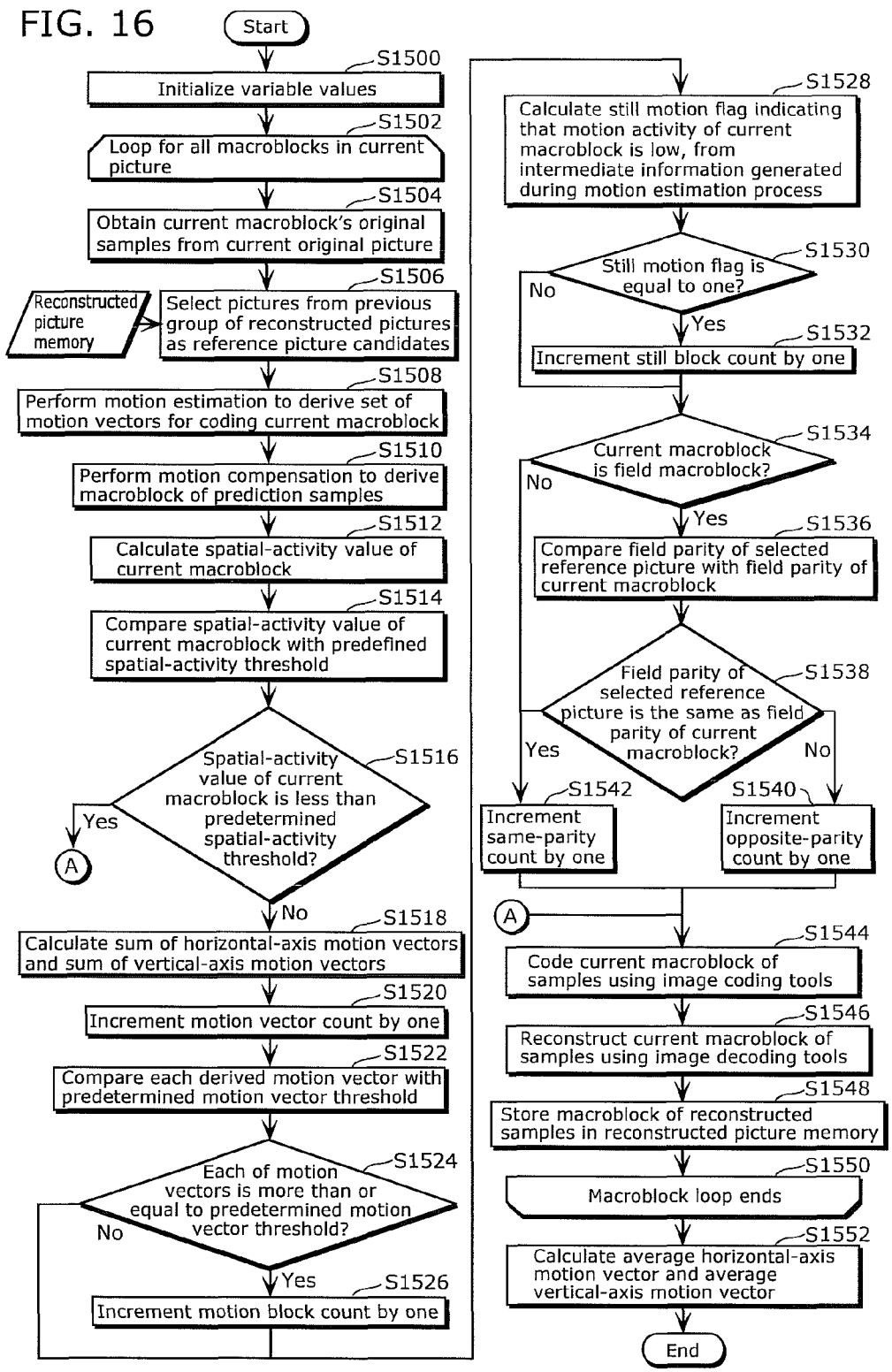
FIG. 16 is a flowchart indicating image coding processes according to Embodiment 7 in the present invention.

FIG. 16 is a flowchart indicating image coding processes according to Embodiment 7.

The parameter initialization unit 1620 initializes variable values (S1500). More specifically, a sum of horizontal-axis motion vectors, a sum of vertical-axis motion vectors, a motion vector count, a motion block count, a still block count, a same-parity count, and an opposite-parity count are initialized to zero.

Next, the macroblock loop for all the macroblocks in the current picture is started (S1502).

The sample extraction unit 1600 obtains current macroblock's original samples from the current original picture (S1504).

Next, the reference picture selection unit 1604 selects pictures from a previous group of reconstructed pictures in the reconstructed picture memory as reference picture candidates (S1506).

Next, the motion estimation unit 1606 performs motion estimation to derive a set of motion vectors for coding the current macroblock (S1508).

Next, the motion compensation unit 1608 performs motion compensation to derive a macroblock of prediction samples (S1510).

Next, the spatial activity calculation unit 1616 calculates a spatial-activity value of the current macroblock (S1512). The spatial-activity value is a value indicating spatial complexity of an image. One example of the spatial activity value is statistical variance.

[Math 1]

$$SpatialAct = \text{variance}(macroblock) \quad \text{(Equation 1)}$$

$$= \frac{\sum_{m=0}^{M-1}\sum_{n=0}^{N-1}(x(n,m)^2)}{N \times M} - \left(\frac{\sum_{m=0}^{M-1}\sum_{n=0}^{N-1}x(n,m)}{N \times M}\right)^2$$

Here, SpatialAct is calculated as the statistical variance of sample values within the macroblock, and x(n, m) denotes the sample value at a location (n, m) within the macroblock.

Another example of calculation of a spatial activity value is as follows.

[Math 2]

$$SpatialAct = \frac{\sum_{b=0}^{B-1} SmallBlockSpatialAct - \min_{b=0}^{B-1}(SmallBlockSpatialAct)}{B} \quad \text{(Equation 2)}$$

[Math 3]

$$SmallBlockSpatialAct = \text{variance}(SmallBlock) \quad \text{(Equation 3)}$$

$$= \frac{\sum_{f=0}^{F-1}\sum_{e=0}^{E-1}(x(f,e)^2)}{E \times F} - \left(\frac{\sum_{f=0}^{F-1}\sum_{e=0}^{E-1}x(f,e)}{E \times F}\right)^2$$

Here, SmallBlock denotes a small-block of E×F samples, where E represents the number of samples in width and N (macroblock width) is divisible by E. On the other hand, F represents the number of samples in height and M (macroblock height) is divisible by F. Examples of E and F values are 4 and 4, respectively. SmallBlockSpatialAct denotes a small-block spatial-activity value calculated as the statistical variance of sample values within the small-block, B indicates the number of small-blocks within a target large-block, x(f, e) denotes the sample value at a location (f, e) within the small-block, and min denotes the minimum/smallest value.

Another example of a spatial activity value is a sum of absolute differences between adjacent samples.

[Math 4]

$$HorizontalDiff = \frac{\sum_{m=0}^{M-1}\sum_{n=0}^{N-2} \text{ABS}(x(n,m) - x(n+1,m))}{N \times M} \quad \text{(Equation 4)}$$

[Math 5]

$$VerticalDiff = \frac{\sum_{m=0}^{M-2}\sum_{n=0}^{N-1} \text{ABS}(x(n,m) - x(n,m+1))}{N \times M} \quad \text{(Equation 5)}$$

[Math 6]

$$SpatialAct = HorizonalDiff + VerticalDiff \quad \text{(Equation 6)}$$

Here, x(n, m) denotes the sample value at a location (n, m) within the macroblock, and ABS represents taking the absolute value.

The spatial activity comparator unit 1618 compares the spatial-activity value of the current macroblock with a predefined spatial-activity threshold (S1514). The spatial activity comparator unit 1618 checks if the spatial-activity value of the current macroblock is less than the predetermined spatial-activity threshold (S1516).

If true (Yes at S1516), the process of obtaining motion information is skipped, and the image coding unit 1610 codes the current macroblock (S1544). Otherwise (No at S1516), it will proceed to the next process (S1518).

The processes of switching using the spatial-activity value (S1512, S1514, and S1516) are optional. When the processes of switching using the spatial-activity value (S1512, S1514, and S1516) are not performed, the next process (S1518) is performed after the motion compensation (S1510).

Next, the motion vector summation unit 1646 calculates a sum of horizontal-axis motion vectors and a sum of vertical-axis motion vectors by adding current macroblock's horizontal-axis and vertical-axis motion vectors, respectively (S1518).

Next, the summation unit 1650 increments the motion vector count by one (S1520).

When an average motion vector is not used as motion information, the summation processes (S1518 and S1520) may be skipped.

Next, the motion vector comparator unit 1656 compares each derived motion vector with a predetermined motion vector threshold (S1522). Then, the motion vector comparator unit 1656 checks if each of the current macroblock's motion vectors is more than or equal to a predetermined motion vector threshold (S1524).

If true (Yes at S1524), the next process (S1526) is executed. Otherwise (No at S1524), the next process (S1526) is skipped.

Next, the summation unit 1650 increments the motion block count by one (S1526).

When the motion block count is not used as motion information, the processes of scaling the motion block count (S1522, S1524, and S1526) may be skipped.

Next, the still flag calculation unit 1664 calculates a still motion flag from intermediate information generated during the motion estimation process (S1528). The still motion flag indicates that the motion activity of the current macroblock is low. One example of the still motion flag implementation in the case of H.264 video coding standard is as follows.

[Math 7]

$$StillFlag = ColZeroFlag \qquad \text{(Equation 7)}$$

Next, the still flag comparator unit 1666 checks if the still motion flag is equal to one (S1530). If true (Yes at S1530), the next process (S1532) is executed. Otherwise (No at S1530), the next process (S1532) is skipped.

Next, the summation unit 1670 increments the still block count by one (S1532).

When the still block count is not used as motion information, the processes of scaling the still block count (S1528, S1530, and S1532) may be skipped.

Next, the coding type comparator unit 1674 checks if the current macroblock is a field macroblock (S1534). If true (Yes at S1534), it will proceed to the process of comparing parities (S1536). Otherwise (No at S1534), it will proceed to the process of scaling the same-parity count (S1542).

Next, the field parity comparator unit 1678 compares the field parity of the selected reference picture with the field parity of the current macroblock (S1536). Then, the field parity comparator unit 1678 checks if the field parity of the selected reference picture is the same as the field parity of the current macroblock (S1538).

If true (Yes at S1538), the summation unit 1690 increments the same-parity count by one (S1542). Otherwise (No at S1538), the summation unit 1690 increments the opposite-parity count by one (S1540).

When the same-parity count and the opposite-parity count are not used as the motion information, the processes of scaling the parity count (S1534, S1536, S1538, S1540, and S1542) may be skipped.

Next, the image coding unit 1610 codes the current macroblock of samples using image coding tools (S1544). Next, the image decoding unit 1614 reconstructs the macroblock of samples using image decoding tools (S1546). Next, the image decoding unit 1614 stores the macroblock of reconstructed samples in the picture memory unit 1602 (S1548).

Then, the macroblock loop ends (S1550).

After coding all the macroblocks in a picture is finished, the average motion vector calculation unit 1654 calculates the average horizontal-axis motion vector and the average vertical-axis motion vector as below (S1552).

[Math 8]

$$AverageHorizontalMV = SumHorizontalMV \div motion\_vector\_count \qquad \text{(Equation 8)}$$

[Math 9]

$$AverageVerticalMV = SumVerticalMV \div motion\_vector\_count \qquad \text{(Equation 9)}$$

Here, SumHorizontalMV and SumVerticalMV are calculated in the process of summing motion vectors (S1518). Motion_vector_count represents the number of macroblocks whose motion vectors are added into the sum.

When an average motion vector is not used as motion information, the process of calculating the motion vector average (S1552) may be skipped.

As described above, the image coding apparatus according to Embodiment 7 can obtain various motion information of the current picture. The obtained motion information is evaluated in methods described in other Embodiments. Then, the coding type of the next picture is determined. Furthermore, the various motion information of the current picture is derived from the information generated by coding the current picture. Thus, increase in the complexity can be suppressed.

Furthermore, when the spatial activity is low, the precision of determining whether or not a block is moving becomes low. Thus, as described above, motion information may be obtained only from a block in the current picture, where the spatial-activity value is more than or equal to a predefined threshold. Here, the motion information may be obtained only from a block in the current picture, where the spatial-activity value is more than or equal to a predefined threshold in other Embodiments.

Embodiment 8

The processing described in Embodiments 1 to 7 can be simply implemented by recording, in a recording medium, a program for implementing the configuration for the image coding method described in Embodiments 1 to 7. The recording medium may be any recording medium as long as the program can be recorded thereon, such as a magnetic disk, an optical disc, a magnetic optical disk, an IC card, and a semiconductor memory.

Hereinafter, the applications to the image coding method described in Embodiments 1 to 7 and a system using the same will be described.

Figure 17:
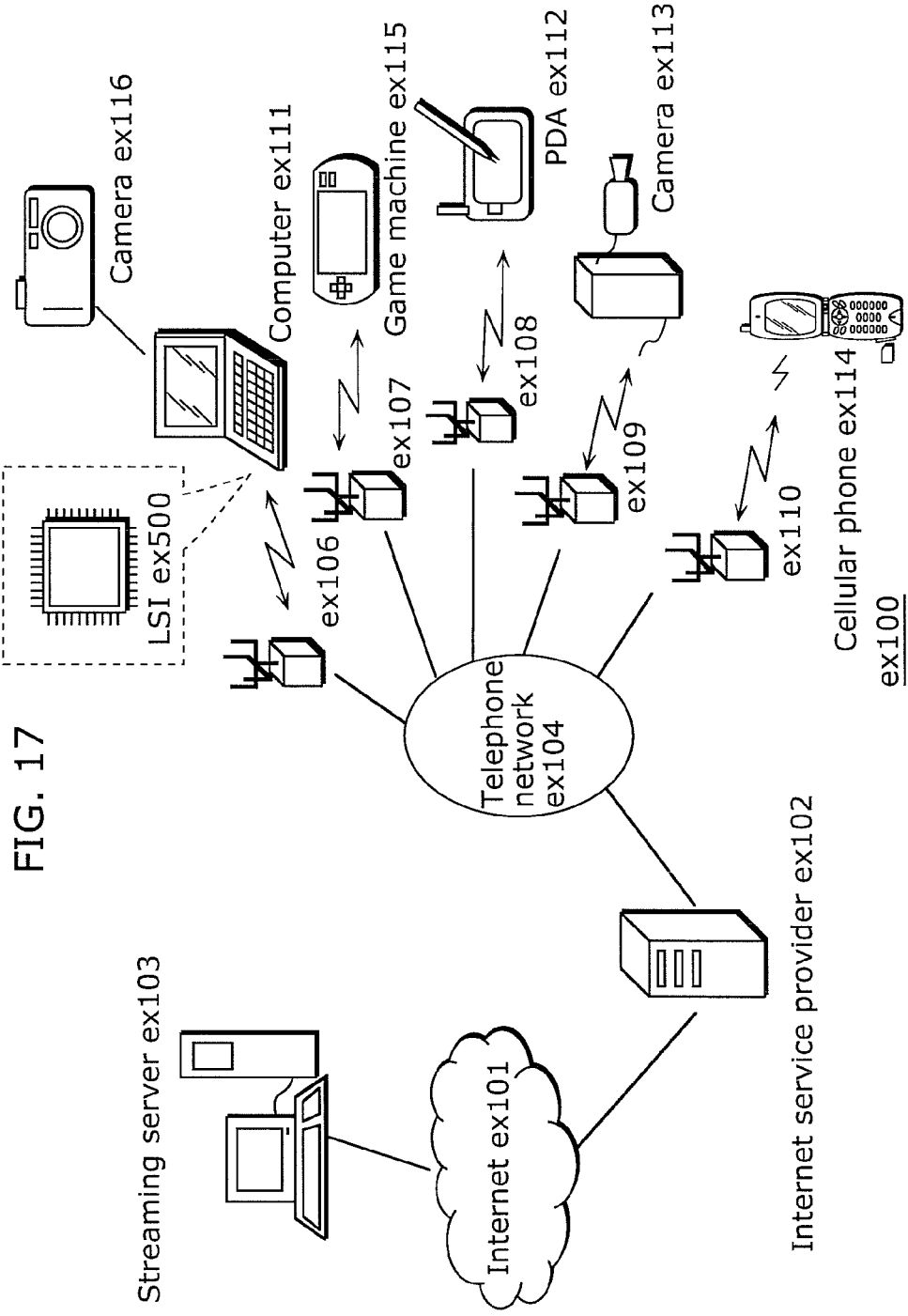
FIG. 17 schematically illustrates an overall configuration of a content providing system for implementing content distribution services.

FIG. 17 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 17, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and/or moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by a Large Scale Integration (LSI) ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers or computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Each of the devices included in the content providing system ex100 may perform coding using the image coding method described in each of Embodiments.

The cellular phone ex114 will be described as an example of such a device.

Figure 18:
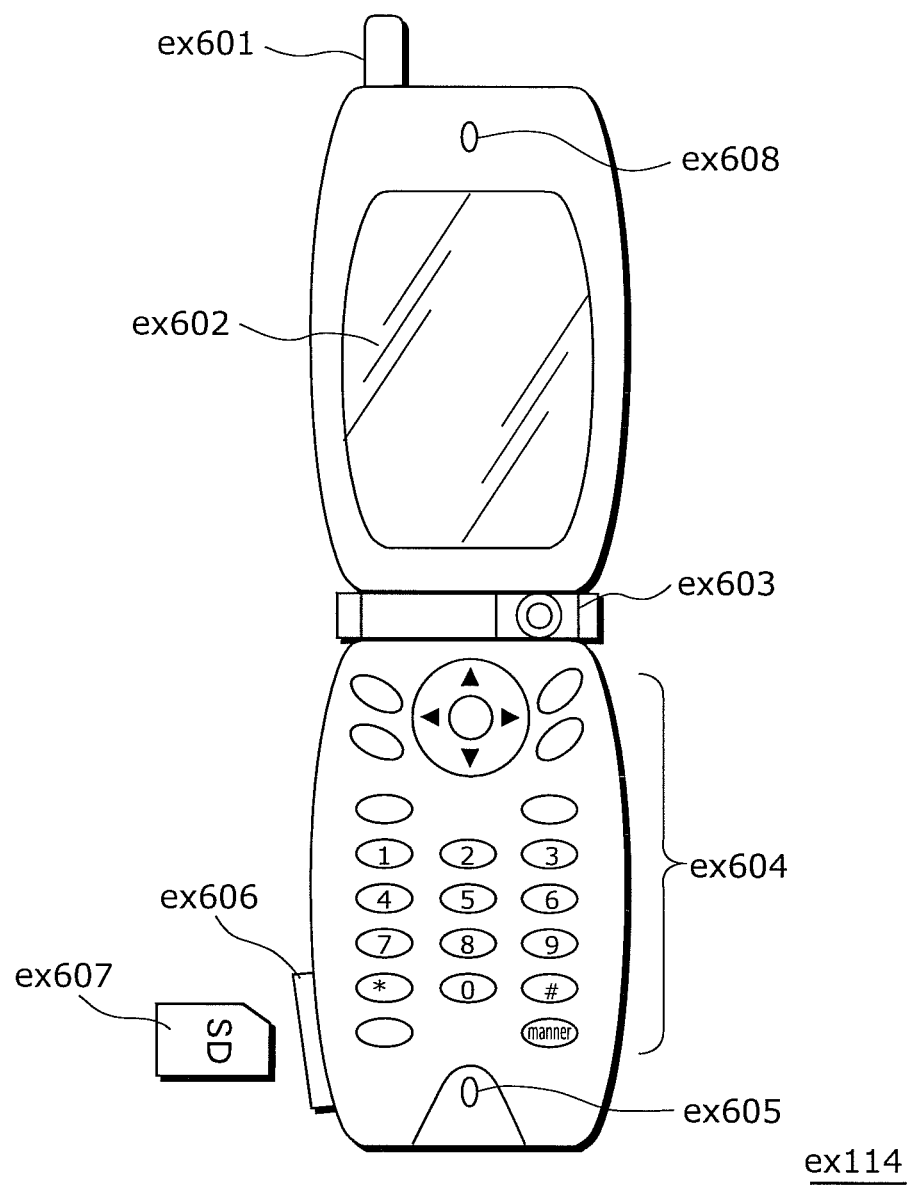
FIG. 18 illustrates an external view of a cellular phone.

FIG. 18 illustrates the cellular phone ex114 that uses the image coding method described in Embodiment 1. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a non-volatile memory that is electrically rewritable and erasable.

Figure 19:
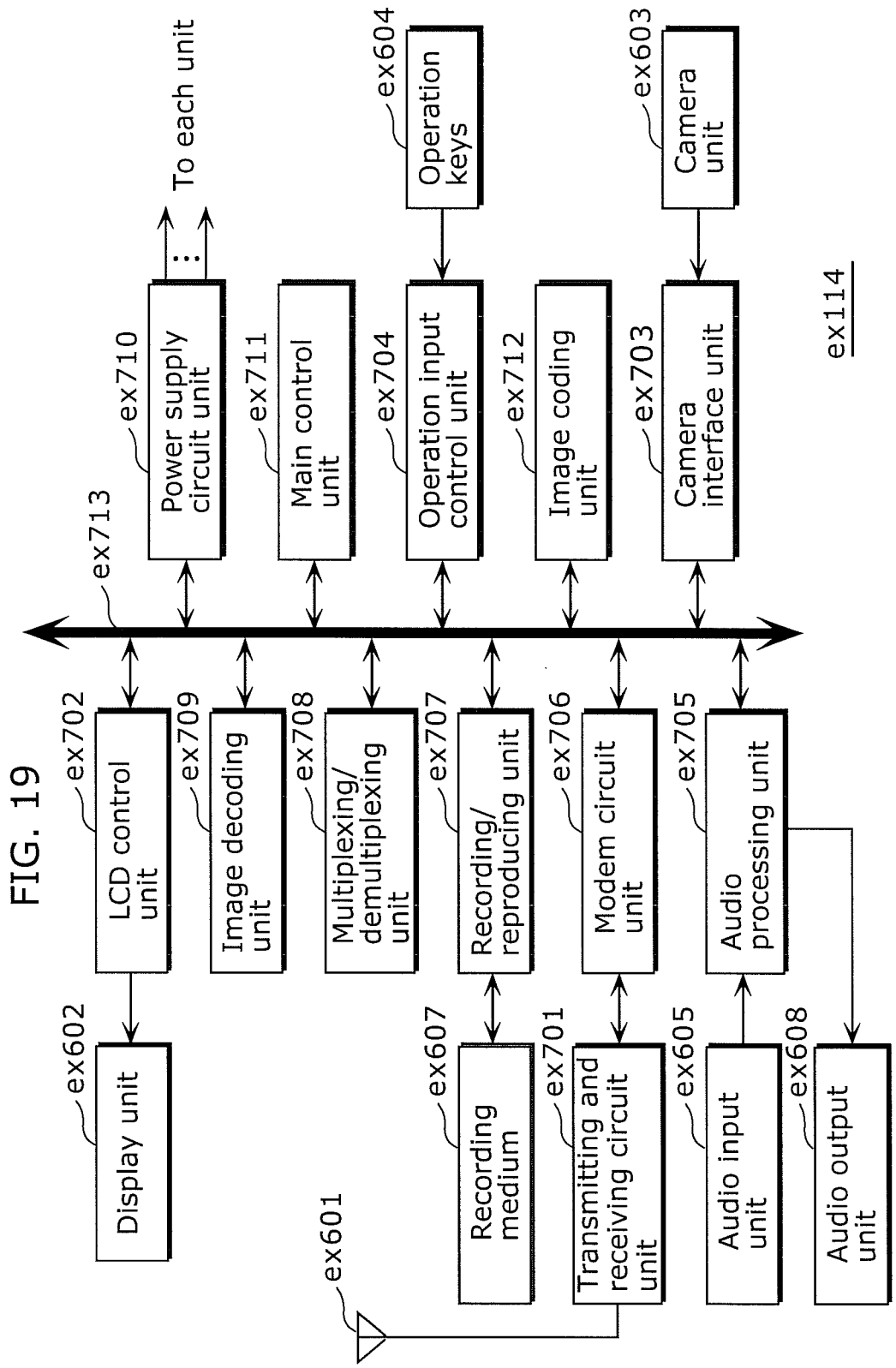
FIG. 19 is a block diagram illustrating an example of a configuration of a cellular phone.

Next, the cellular phone ex114 will be described with reference to FIG. 19. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data, under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera interface unit ex703. Furthermore, when the image data is not transmitted, the image data captured by the camera unit ex603 can be displayed directly on the display unit ex602 via the camera interface unit ex703 and the LCD control unit ex702.

The image coding unit ex712 including the image coding apparatus as described for the present invention compresses and codes the image data supplied from the camera unit ex603 using the coding method employed by the image coding apparatus as shown in Embodiments so as to transform the data into coded image data, and sends the data out to the multiplexing/demultiplexing unit ex708. Furthermore, the cellular phone ex114 simultaneously sends out, as digital audio data, the audio collected by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bit stream of image data and that of audio data, and supplies the coded image data to the image decoding unit ex709 and the audio data to the audio processing unit ex705, respectively via the synchronous bus ex713.

Next, the image decoding unit ex709 decodes the bit stream of the image data using a decoding method corresponding to the coding method as described in Embodiments so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 20:
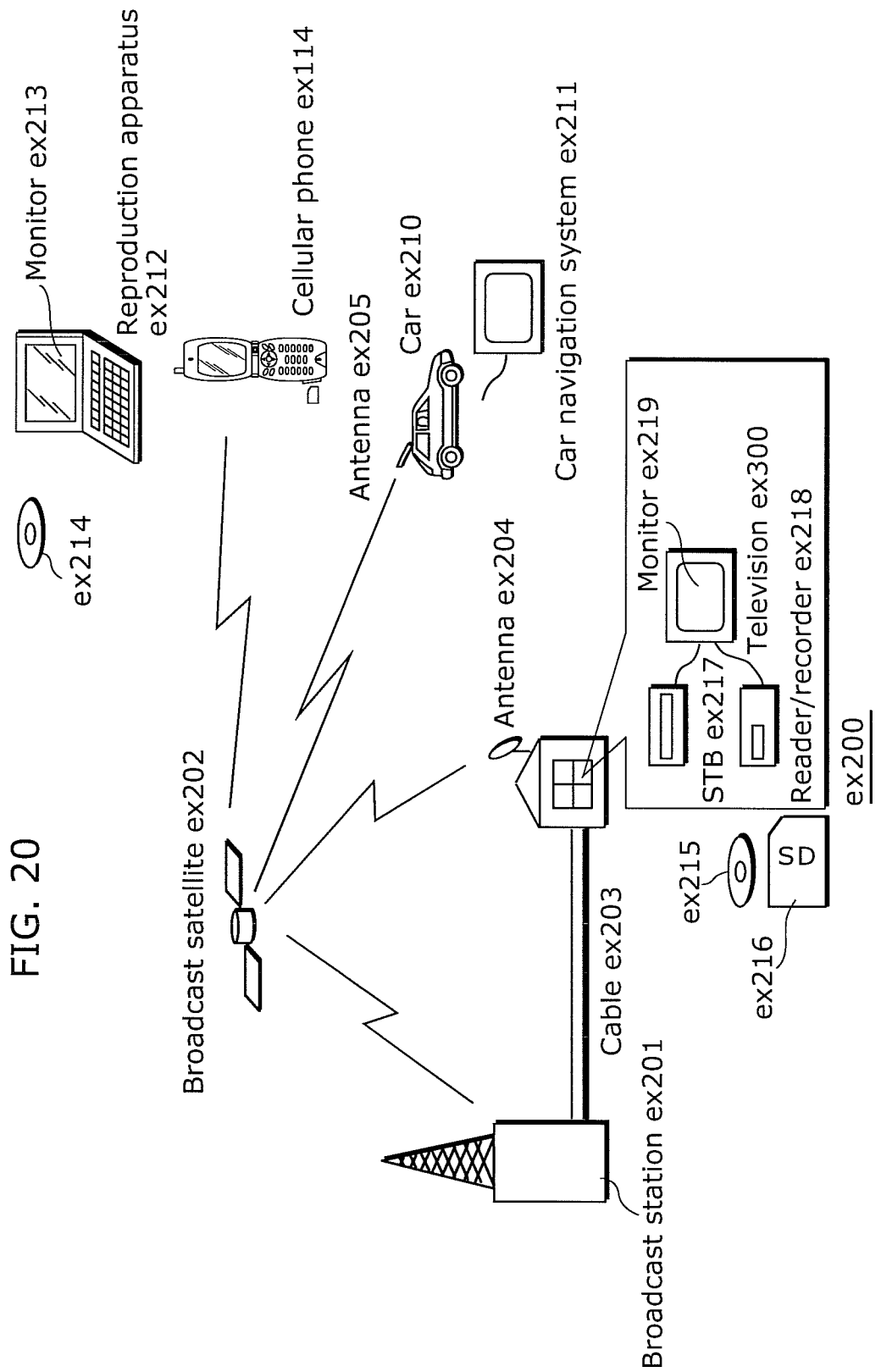
FIG. 20 schematically illustrates an example of an overall configuration of a digital broadcasting system.

The present invention is not limited to the above-mentioned system because terrestrial or satellite digital broadcasting has been in the news lately, and at least the image coding apparatus described in Embodiment 1 can be incorporated into a digital broadcasting system as shown in FIG. 20. More specifically, a broadcast station ex201 communicates or transmits, via radio waves to a broadcast satellite ex202, audio data, video data, or a bit stream obtained by multiplexing the audio data and the video data. Upon receipt of the bit stream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bit stream and reproduces the decoded bit stream. Furthermore, a reader/recorder ex218 that reads and decodes such a bit stream obtained by multiplexing image data and audio data that are recorded on recording media ex215 and 216, such as a CD and a DVD may include an image decoding apparatus. In this case, the reproduced video signals are displayed on the monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300. Also, a car ex210 having an antenna ex205 can receive signals from the satellite ex202 or the base station ex201 for reproducing video on a display device such as a car navigation system ex211 set in the car ex210.

Furthermore, the image coding apparatus as shown in each of Embodiments can be implemented in the reader/recorder ex218 (i) for reading and decoding the video data, the audio data, or the coded bit stream obtained by multiplexing the video data and the audio data, or (ii) for coding the video data, the audio data, or the coded bit stream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bit stream is recorded. For example, another reproduction apparatus ex212 can reproduce the video signals on a monitor ex213, using a recording medium ex214 on which the coded bit stream is copied.

Furthermore, it is also possible to implement the image decoding apparatus in the set top box ex217 connected to the cable ex203 for a cable television or the antenna ex204 for satellite and/or terrestrial broadcasting, so as to display the video signals on the monitor ex219 of the television ex300. The image decoding apparatus may be included not in the set top box but in the television ex300.

Figure 21:
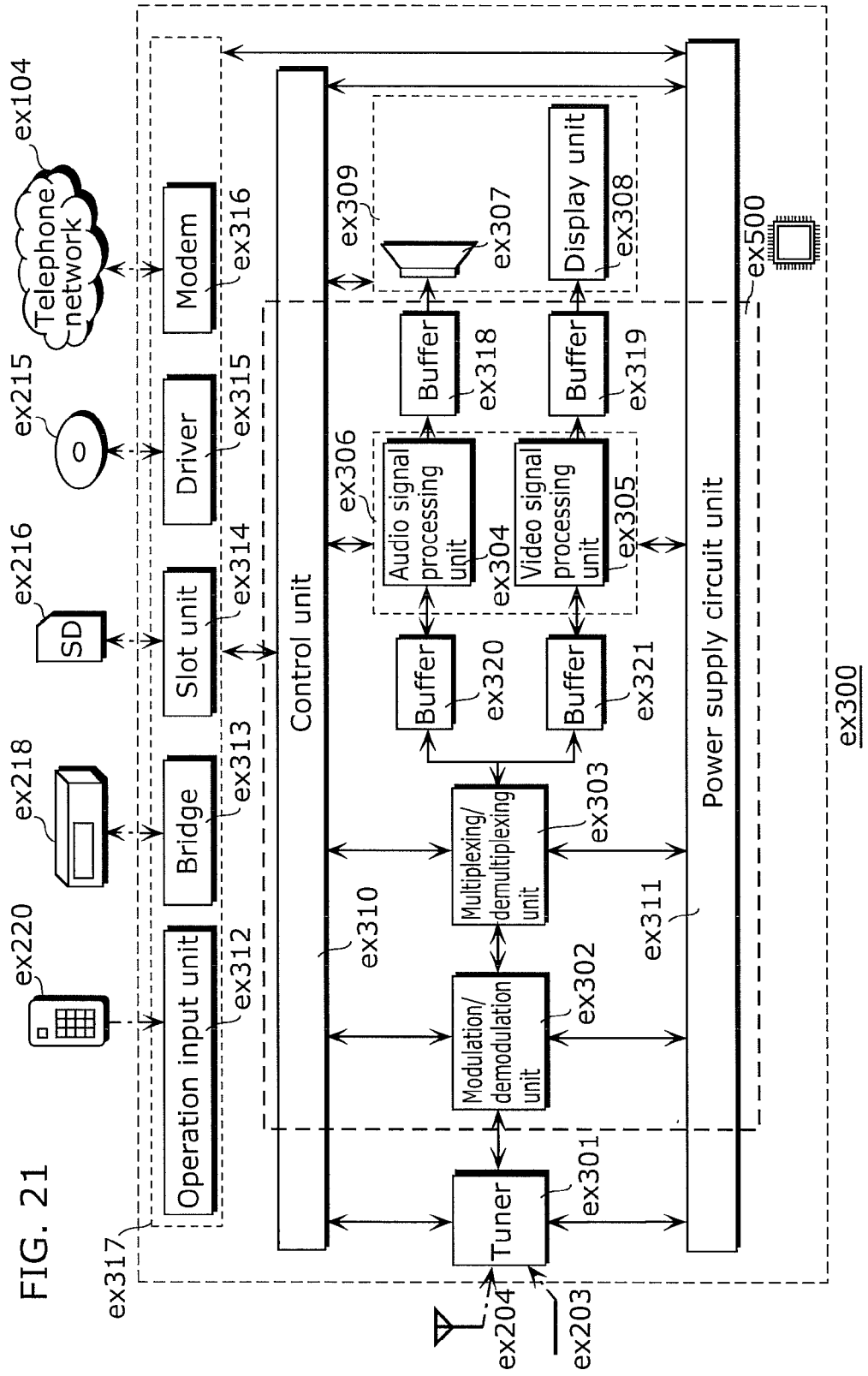
FIG. 21 is a block diagram illustrating an example of a configuration of a television.

FIG. 21 illustrates the television (receiver) ex300 that uses the image coding method described in each of Embodiments. The television ex300 includes: a tuner ex301 that obtains or provides a bit stream of video information through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. Furthermore, the television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using a decoding method corresponding to the image coding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disc, and a SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may not be capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 22:
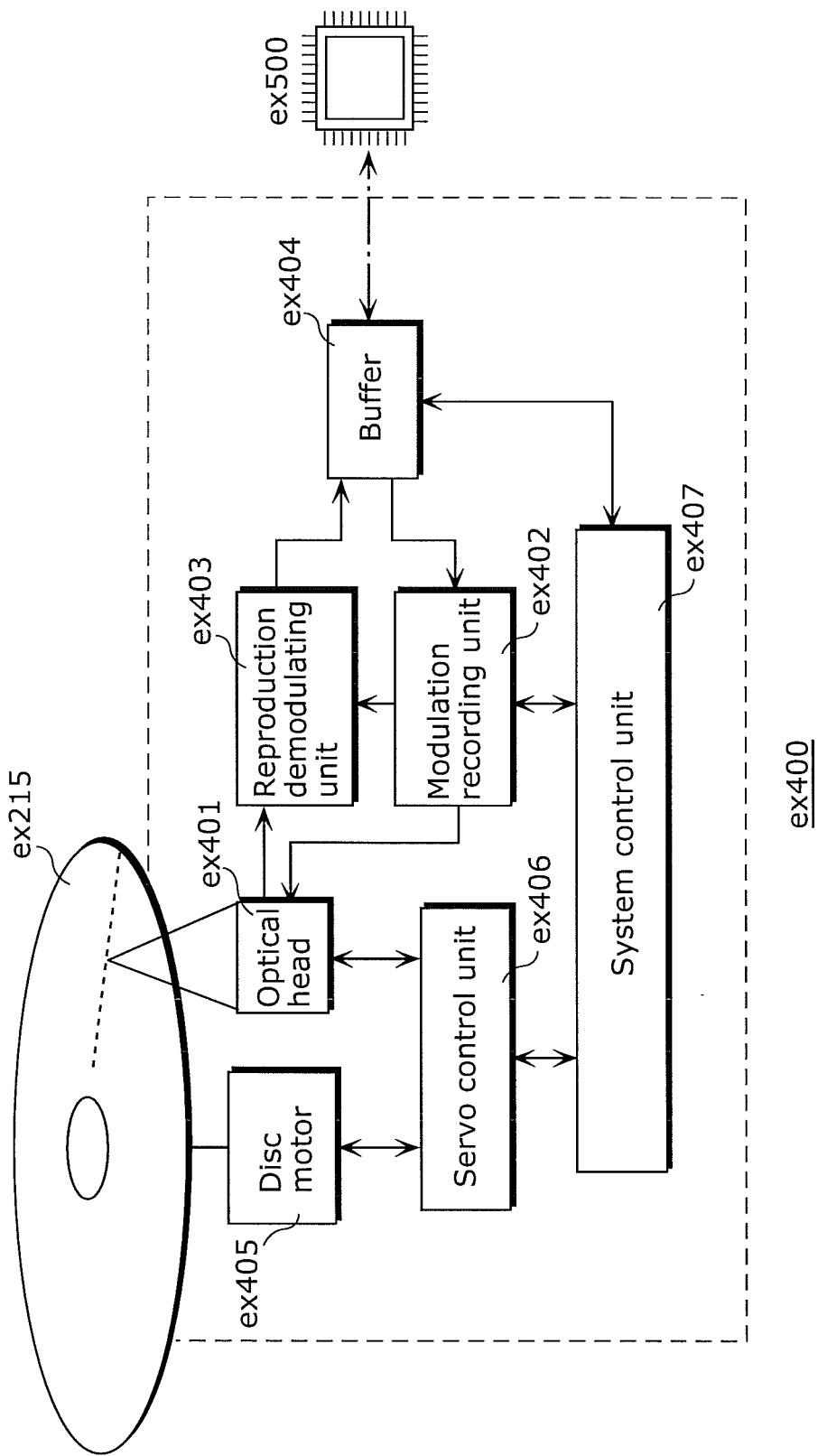
FIG. 22 is a block diagram illustrating an example of a configuration of an information reproducing/recording unit that reads and writes information from or on a recording medium that is an optical disc.

As an example, FIG. 22 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disc motor ex405 rotates the recording medium ex215. A servo control unit ex406 moves the optical head ex401 to a predetermined information track while controlling the rotation drive of the disc motor ex405 so as to follow the laser spot. The system control unit ex407 controls overall the information reproducing/recording unit ex400. The reading and writing processes can be implemented by the system control unit ex407 using various information held in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 23:
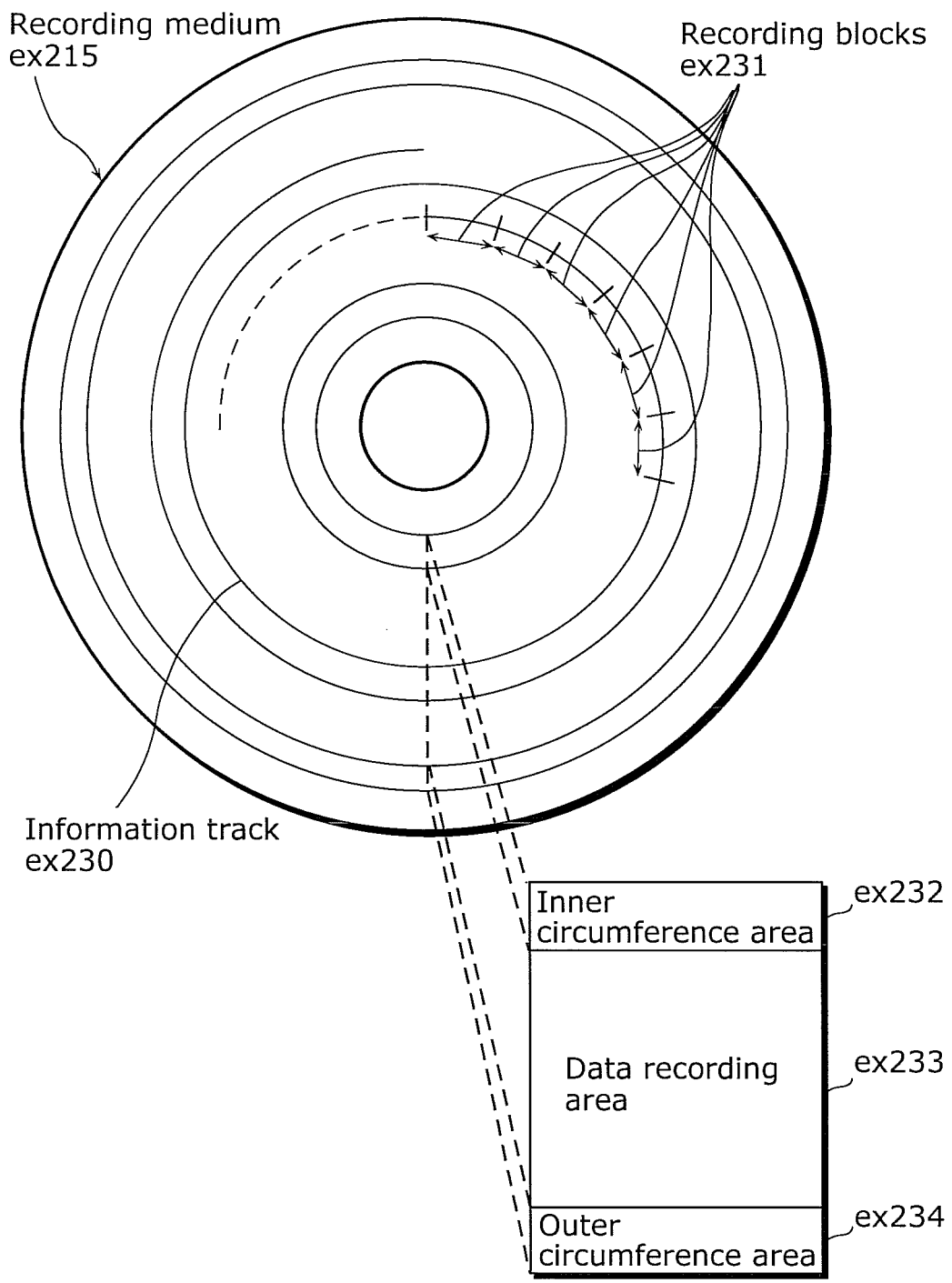
FIG. 23 illustrates an example of a configuration of a recording medium that is an optical disc.

FIG. 23 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and in the data recording area ex233 of the recording medium ex215.

Although an optical disc having a layer, such as a DVD and a BD is described as an example in the description, the optical disk is not limited to such, and may be an optical disk having a multilayer structure and capable of being recorded on a part other than the surface. Furthermore, the optical disc may have a structure for multidimensional recording/reproduction, such as recording information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 21. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method in each of Embodiments can be used in any of the devices and systems described. Thus, the advantages described in Embodiments can be obtained.

Furthermore, the present invention is not limited to Embodiments, and various modifications and revisions are possible without departing from the scope of the present invention.

Embodiment 9

Figure 24:
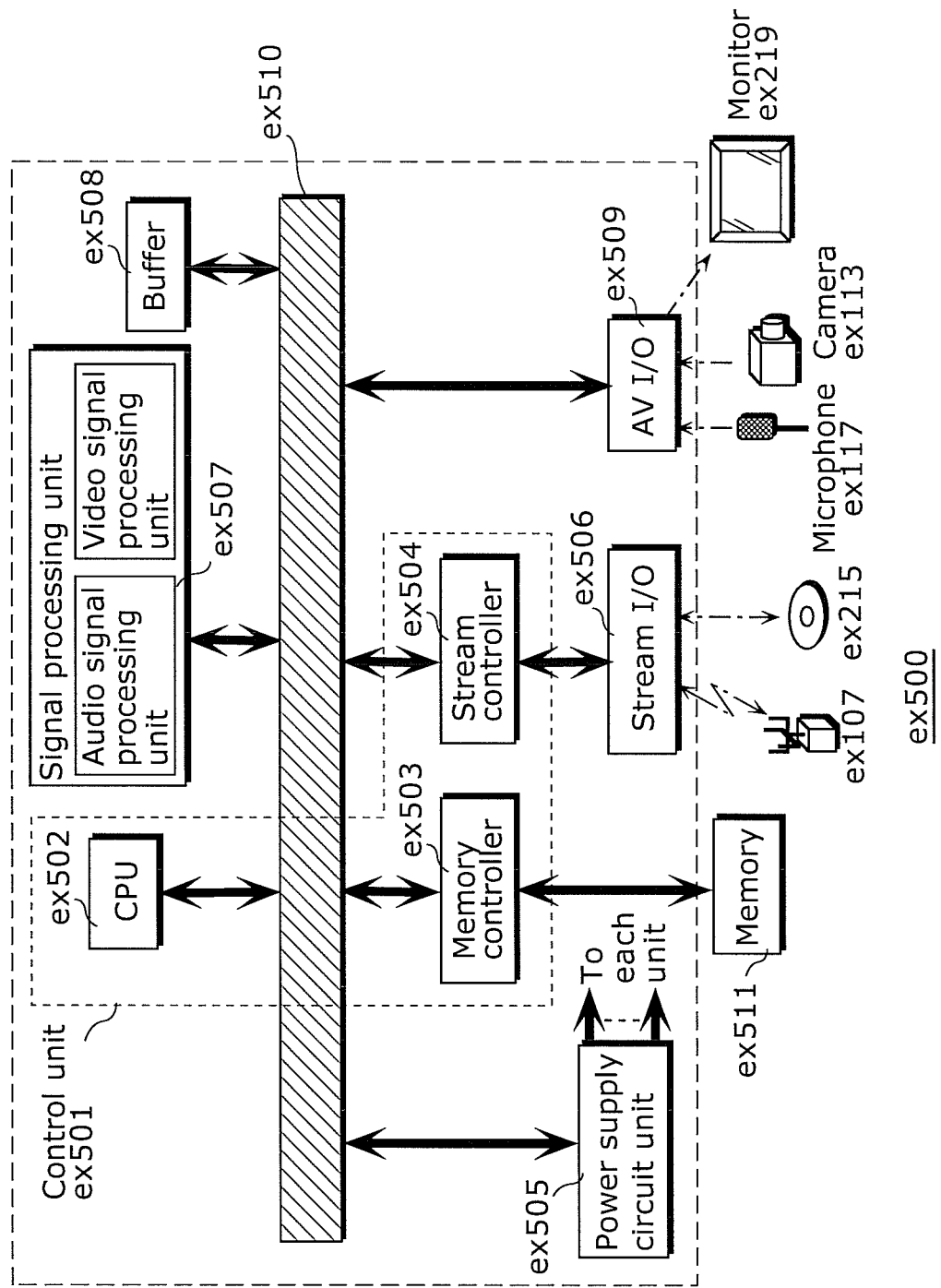
FIG. 24 is a block diagram illustrating an example of a configuration of an integrated circuit for implementing the image coding method according to each of Embodiments.

Each of the image coding method and the image coding apparatus in Embodiments 1 to 8 is typically achieved in the form of an integrated circuit or a LSI circuit. As an example, FIG. 24 illustrates a configuration of an LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bit stream is transmitted to a base station ex107, or written into the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Here, the decoding of the video signal is decoding corresponding to the coding described in Embodiments. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve the integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

As described above in Embodiments, the image coding apparatus according to the present invention determines the coding type of the next picture based on the motion information of the current picture. Thereby, the increase in complexity is suppressed, and the coding type is appropriately determined.

Although the image coding method and the image coding apparatus according to the present invention are described based on Embodiments, the present invention is not limited to these Embodiments. Those skilled in the art will readily appreciate that many modifications are possible in the exemplary Embodiments without materially departing from the novel teachings and advantages of the present invention. Accordingly, all such modifications and other embodiments conceivable by arbitrarily combining the structural elements and/or steps of different embodiments are intended to be included within the scope of the present invention.

Furthermore, since each of the configurations and the processes described in Embodiments is an example, the configurations or the processes can be shuffled. For example, the order of the processes may be shuffled, and a process executed by a particular constituent element may be executed by another constituent element.

Furthermore, although the image coding apparatus according to the present invention scales a motion for each macroblock, it may scale the motion for each block having a different size from the macroblock.

Furthermore, the image coding apparatus according to the present invention may determine the coding type of a slice as the coding type of a picture.

Furthermore, the next picture whose coding type is to be determined may be the next picture in coding order or in display order. In the case of the coding order, the processes are smoothly performed. In the case of the display order, the precision of determining the coding type becomes higher. When the next picture whose coding type is to be determined is the next picture in display order, the next picture is preferably a picture subsequent to the current picture in coding order. Thereby, the processes are smoothly performed.

Furthermore, when the next picture is coded in frame coding, a particular block included in the next picture may be coded in field coding. In particular, when a difference between a value indicated by motion information and a threshold for determining one of frame coding and field coding is smaller, the image coding apparatus according to the present invention may determine one of frame coding and field coding for each block.

Furthermore, the present invention can be implemented not only as the image coding apparatus but also as a method using processing units included in the image coding apparatus as steps. Additionally, the present invention can be implemented as a program causing a computer to execute such steps. Moreover, the present invention can be implemented as a computer-readable recording medium in which the program is stored, such as a CD-ROM.

INDUSTRIAL APPLICABILITY

The image coding method according to the present invention is applicable to an image capturing apparatus, such as a digital video recorder and a digital video camera.

[Reference Signs List]

| | |
|---|---|
| 100 | Picture coding unit |
| 102 | Coding type determining unit |
| 200, 1000, 1200 | Motion vector comparator unit |
| 202, 606, 802, 1008, 1204, 1402 | Next picture coding type setting unit |
| 600, 602, 1002, 1004 | Scaling unit |
| 604, 1006 | Parity count comparator unit |
| 800, 1202 | Motion block count comparator unit |
| 1400 | Still block count comparator unit |
| 1600 | Sample extraction unit |
| 1602 | Picture memory unit |
| 1604 | Reference picture selection unit |
| 1606 | Motion estimation unit |
| 1608 | Motion compensation unit |
| 1610 | Image coding unit |
| 1612 | Entropy coding unit |
| 1614 | Image decoding unit |
| 1616 | Spatial activity calculation unit |
| 1618 | Spatial activity comparator unit |
| 1620 | Parameter initialization unit |
| 1622, 1624, 1626, 1628, 1630, 1632, 1648, 1652, 1662, 1672, 1686, 1692 | OR gate unit |
| 1634, 1636, 1638, 1640, 1642, 1644, 1658, 1668, 1680, 1688 | Switch unit |
| 1646 | Motion vector summation unit |
| 1650, 1660, 1670, 1684, 1690 | Summation unit |
| 1654 | Average motion vector calculation unit |
| 1656 | Motion vector comparator unit |
| 1664 | Still flag calculation unit |
| 1666 | Still flag comparator unit |
| 1674 | Coding type comparator unit |
| 1678 | Field parity comparator unit |
| D1 | Reference picture information |
| D3 | Set of reference pictures |
| D5 | Set of motion vectors |
| D6 | reference index (set of reference indexes) |
| D7 | Estimation information |
| D8 | Inter prediction sample |
| D9 | Quantized residuals |
| D10 | Reconstructed samples |
| D11 | Sample |
| D12 | Spatial-activity value |
| D13, D47, D52, D55, D63 | Control signal |
| D14, D20, D21, D22, D38, D39 | Sum of motion vectors |
| D15, D23, D24, D25, D40, D41 | Motion vector count |
| D16, D26, D27, D28, D42, D43, D44, D45 | Motion block count |
| D17, D29, D30, D31, D48, D49, D50, D51 | Still block count |
| D18, D32, D33, D34, D56, D57, D58, D64 | Same-parity count |
| D19, D35, D36, D37, D59, D60, D61, D62 | Opposite-parity count |
| D46 | Still flag |
| D81, D82, D83, D84, D85, D86, D87, D88, D89, D90, D91, D92, D93 | Signal |
| ex100 | Content providing system |
| ex101 | Internet |
| ex102 | Internet service provider |
| ex103 | Streaming server |
| ex104 | Telephone network |
| ex106, ex107, ex108, ex109, ex110 | Base station |
| ex111 | Computer |
| ex112 | PDA |
| ex113, ex116 | Camera |
| ex114 | Cellular phone equipped with camera (cellular phone) |
| ex115 | Game machine |
| ex117 | Microphone |
| ex200 | Digital broadcasting system |
| ex201 | Broadcast station |
| ex202 | Broadcast satellite (satellite) |
| ex203 | Cable |
| ex204, ex205, ex601 | Antenna |
| ex210 | Car |
| ex211 | Car navigation system |
| ex212 | Reproduction apparatus |
| ex213, ex219 | Monitor |
| ex214, ex215, ex216, ex607 | Recording medium |
| ex217 | Set top box (STB) |
| ex218 | Reader/recorder |
| ex220 | Remote controller |
| ex230 | Information track |
| ex231 | Recording blocks |
| ex232 | Inner circumference area |
| ex233 | Data recording area |
| ex234 | Outer circumference area |
| ex300 | Television |
| ex301 | Tuner |
| ex302 | Modulation/demodulation unit |
| ex303 | Multiplexing/demultiplexing unit |
| ex304 | Audio signal processing unit |
| ex305 | Video signal processing unit |
| ex306, ex507 | Signal processing unit |
| ex307 | Speaker |
| ex308, ex602 | Display unit |
| ex309 | Output unit |
| ex310, ex501 | Control unit |
| ex311, ex505, ex710 | Power supply circuit unit |
| ex312 | Operation input unit |
| ex313 | Bridge |
| ex314, ex606 | Slot unit |
| ex315 | Driver |
| ex316 | Modem |
| ex317 | Interface unit |
| ex318, ex319, ex320, ex321, ex404, ex508 | Buffer |
| ex400 | Information reproducing/recording unit |
| ex401 | Optical head |
| ex402 | Modulation recording unit |

-continued

[Reference Signs List]

| | |
|---|---|
| ex403 | Reproduction demodulating unit |
| ex405 | Disc motor |
| ex406 | Servo control unit |
| ex407 | System control unit |
| ex500 | LSI |
| ex502 | CPU |
| ex503 | Memory controller |
| ex504 | Stream controller |
| ex506 | Stream I/O |
| ex509 | AV IO |
| ex510 | Bus |
| ex603 | Camera unit |
| ex604 | Operation keys |
| ex605 | Audio input unit |
| ex608 | Audio output unit |
| ex701 | Transmitting and receiving circuit unit |
| ex702 | LCD control unit |
| ex703 | Camera interface unit (camera I/F unit) |
| ex704 | Operation input control unit |
| ex705 | Audio processing unit |
| ex706 | Modem circuit unit |
| ex707 | Recording/reproducing unit |
| ex708 | Multiplexing/demultiplexing unit |
| ex709 | Image decoding unit |
| ex711 | Main control unit |
| ex712 | Image coding unit |
| ex713 | Synchronous bus |

The invention claimed is:

1. An image coding method of coding pictures, the method comprising:
coding a current picture included in pictures;
determining whether a picture next to the current picture is to be coded in frame coding or field coding, depending on motion information that is information for indicating a motion in the current picture; and
coding the next picture in frame coding when it is determined that the next picture is to be coded in frame coding, and coding the next picture in field coding when it is determined that the next picture is to be coded in field coding,
wherein in the determining, a still block count is obtained from one or more blocks included in the current picture, and it is determined that the next picture is to be coded in frame coding when the still block count is more than or equal to a first predefined threshold, and determined that the next picture is to be coded in field coding when the still block count is less than the first predefined threshold, the still block count being the number of blocks to which a ColZeroFlag is set, the ColZeroFlag being defined in a video coding standard as a flag indicating no motion or being still.

2. The image coding method according to claim 1, wherein in the determining, a spatial-activity value is obtained for each of one or more blocks included in the current picture, the motion information is obtained only from blocks each having the spatial-activity value that is more than or equal to a predefined threshold among the one or more blocks, and it is determined whether the next picture is to be coded in frame coding or field coding, depending on the obtained motion information.

3. The image coding method according to claim 1, wherein in the determining, it is determined whether the next picture in coding order is to be coded in frame coding or field coding.

4. The image coding method according to claim 1, wherein in the determining, it is determined whether the next picture in display order is to be coded in frame coding or field coding.

5. An image coding apparatus that codes pictures, the apparatus comprising:
a picture coding unit configured to code a current picture included in the pictures; and
a coding type determining unit configured to determine whether a picture next to the current picture is to be coded in frame coding or field coding, depending on motion information that is information for indicating a motion in the current picture,
wherein the coding type determining unit is configured to obtain a still block count from one or more blocks included in the current picture, and determine that the next picture is to be coded in frame coding when the still block count is more than or equal to a first predefined threshold, and that the next picture is to be coded in field coding when the still block count is less than the first predefined threshold, the still block count being the number of blocks to which a ColZeroFlag is set, the ColZeroFlag being defined in a video coding standard as a flag indicating no motion or being still, and
the picture coding unit is configured to code the next picture in frame coding when the coding type determining unit determines that the next picture is to be coded in frame coding, and to code the next picture in field coding when the coding type determining unit determines that the next picture is to be coded in field coding.

6. A non-transitory computer-readable recording medium on which a program for causing a computer to execute steps included in the image coding method according to claim 1 is stored.

7. An integrated circuit that codes pictures, the circuit comprising:
a picture coding unit configured to code a current picture included in the pictures; and
a coding type determining unit configured to determine whether a picture next to the current picture is to be coded in frame coding or field coding, depending on motion information that is information for indicating a motion in the current picture,
wherein the coding type determining unit is configured to obtain a still block count from one or more blocks included in the current picture, and determine that the next picture is to be coded in frame coding when the still block count is more than or equal to a first predefined threshold, and that the next picture is to be coded in field coding when the still block count is less than the first predefined threshold, the still block count being the number of blocks to which a ColZeroFlag is set, the ColZeroFlag being defined in a video coding standard as a flag indicating no motion or being still, and
the picture coding unit is configured to code the next picture in frame coding when the coding type determining unit determines that the next picture is to be coded in frame coding, and to code the next picture in field coding when the coding type determining unit determines that the next picture is to be coded in field coding.

* * * * *